(12) United States Patent
Berneth et al.

(10) Patent No.: US 6,183,878 B1
(45) Date of Patent: Feb. 6, 2001

(54) ELECTROCHROMIC SYSTEM

(75) Inventors: Horst Berneth; Uwe Claussen, both of Leverkusen; Dietrich Haarer, Bayreuth; Jochen Schaller, Schwarzenbach; Jürgen Simmerer, Erlangen, all of (DE)

(73) Assignee: Bayer Aktiengesellschaft, Leverkusen (DE)

( * ) Notice: Under 35 U.S.C. 154(b), the term of this patent shall be extended for 0 days.

(21) Appl. No.: 09/147,615

(22) PCT Filed: Jul. 24, 1997

(86) PCT No.: PCT/EP97/03999

§ 371 Date: May 25, 1999

§ 102(e) Date: May 25, 1999

(87) PCT Pub. No.: WO98/05737

PCT Pub. Date: Feb. 12, 1998

(30) Foreign Application Priority Data

Aug. 6, 1996 (DE) ............................................. 196 31 729

(51) Int. Cl.$^7$ ........................................................ C09K 9/02
(52) U.S. Cl. ...................... 428/583; 359/265; 252/301.35
(58) Field of Search ..................................... 428/426, 583; 359/265; 252/301.35

(56) References Cited

U.S. PATENT DOCUMENTS

| | | | |
|---|---|---|---|
| 3,280,701 | 10/1966 | Donnelly | 88/77 |
| 4,902,108 | 2/1990 | Byker | 350/357 |
| 5,151,816 | 9/1992 | Varaprasad et al. | 359/275 |
| 5,272,355 | * 12/1993 | Namavar et al. | 257/3 |

FOREIGN PATENT DOCUMENTS

| | | |
|---|---|---|
| 196 05 448 | 8/1997 | (DE) . |
| 196 05 451 | 8/1997 | (DE) . |
| 0 435 689 | 7/1991 | (EP) . |

OTHER PUBLICATIONS

Hünig et al.; "Topics in Current Chemistry"; vol. 92; 1980; pp. 1–44. (No Month).

Angewandte Chemistry; vol. 90; 1978; pp. 927–938. (No Month).

* cited by examiner

Primary Examiner—Francis J. Lorin
(74) Attorney, Agent, or Firm—Foley & Lardner

(57) ABSTRACT

The invention concerns an electrochrome system comprising a mixture of reducible and oxidizable substances $RED_1$ and $OX_2$, at lest one $RED_1'-OX_2'$ pair being covalently interlinked via a bridge and, for at least one $RED_1''$ or $OX_2''$ substance, the reciprocal conversion of the oxidized form and the reduced form being brought about by the fracture or formation of a σ-bond. The electrochrome system is characterized by simplified electron transfer and reduced secondary reactions.

14 Claims, No Drawings

ELECTROCHROMIC SYSTEM

The present invention relates to an electrochromic system, an electrochromic fluid comprising this electrochromic system, and an electrochromic device.

Electrochromic devices which contain an electrochromic system are already known.

Such devices customarily contain, as the electrochromic system, redox couples which are dissolved in an inert solvent. Additionally, conducting salts, light stabilizers and substances which affect the viscosity may be included.

Used as a redox couple is one reducible and one oxidizable substance each. Both are colorless or only weakly colored. Under the influence of an electric voltage, one of the substances is reduced and the other is oxidized, at least one becoming colored in the process. After the voltage is switched off, the two original redox substances are formed once more, accompanied by bleaching or fading of the color.

U.S. Pat. No. 4,902,108 discloses that those redox couples are suitable in which the reducible substance exhibits at least two chemically reversible reduction waves in the cyclic voltammogram and the oxidizable substance correspondingly exhibits at least two chemically reversible oxidation waves.

Electrochromic devices can be used in many different ways. For example, they may take the form of an automobile rearview mirror which during a journey at night can be darkened by a voltage being applied and thus prevents dazzling by the headlights of other vehicles (compare e.g. U.S. Pat. No. 3,280,701, U.S. Pat. No. 4,902,108, EP-A-0, 435,689). Such devices may further also be employed in window panes or automobile canopies where, after a voltage has been applied, they black out the sunlight. Finally, such devices may also be used to build up a matrix display for graphic representation of information such as letters, numbers and symbols.

Electrochromic devices normally comprise a pair of glass or plastic panes, one of which being mirrored in the case of an automobile mirror. One side of these panes is coated with a transparent, electroconductive layer, e.g. indium tin oxide (ITO). These panes are then used to construct a cell by their electroconductively coated sides which face one another being bonded, preferably cemented, to an annular or rectangular gasket. The gasket establishes a uniform spacing between the panes, for example from 0.1 to 0.5 mm. This cell is then, via a port, filled with an electrochromic solution and is tightly sealed. Via the ITO layer contact can be made separately with the two panes.

The prior art electrochromic systems comprise redox couples which, after reduction and oxidation, form colored free radicals, cationic free radicals or anionic free radicals, which are chemically reactive. As disclosed, for example, by Topics in Current Chemistry, Vol. 92, pp. 1–44 (1980), such (ionic) free radicals may be sensitive with respect to electrophiles or nucleophiles or even free radicals. To achieve a high stability of an electrochromic device containing such an electrochromic system which is to survive several thousands of operating cycles it is therefore necessary to ensure that the solvent used is absolutely free from electrophiles, e.g. protons, nucleophiles and oxygen. It is also necessary to ensure that such reactive species are not formed by electrochemical processes on the electrodes during operation of the electrochromic device.

The reverse reaction to $RED_1$ and $OX_2$ formulated according to the above reaction equation also takes place continuously away from the electrodes within the volume of the solution while the electrochromic device is operated. Because of the described hazards of degradation reactions of the free radicals or (ionic) free radicals by electrophiles, nucleophiles or free radicals it is important for the long-term stability of the display that the reverse reaction in accordance with the above reaction equation can take place as rapidly as possible and without side reactions.

We have found that in an electrochromic system which comprises at least one Red-Ox couple linked covalently with one another via a bridge and further at least one electrochromic substance which after reduction or oxidation is not converted into an (ionic) free radical species but has a closed electron shell in the reduced or oxidized form, the electron transfer is facilitated and side reactions can be avoided.

The present invention therefore relates to an electrochromic system comprising oxidizable substances $RED_1$ which, by releasing electrons at an anode, are converted from a weakly colored or colorless form into a colored form $OX_1$, and reducible substances $OX_2$ which, by accepting electrons at a cathode, are converted from a weakly colored or colorless form into a colored form $RED_2$, the absorbance in the visible region of the spectrum increasing in each of these cases, and the weakly colored or colorless form being recovered in each case after charge equalization, wherein the substances $RED_1$ and $OX_2$ are a mixture comprising at least one couple $RED_1'/OX_2'$ which is linked covalently to one another via a bridge and at least one substance $RED_1''$ or $OX_2''$ in which the reciprocal conversion of oxidized and reducible form takes place by a σ bond being broken or formed.

The reduction and oxidation processes in the electrochromic system according to the invention generally take place by electrons being accepted or released at a cathode or anode, respectively, a potential difference of from 0.3 to 3 V preferably obtaining between the electrodes. After the electric potential is switched off, charge equalization generally takes place spontaneously between the substances $RED_2'$ and $OX_1'$, $RED_2''$ and $OX_1'$ or $RED_2'$ and $OX_1''$, respectively, accompanied by bleaching or fading of the color. Such a charge equalization also takes place even while the current is flowing in the interior of the electrolyte volume.

The novel electrochromic system preferably comprises a) as the couple $RED_1'/OX_2'$ at least one electrochromic substance according to the formula (I)

 (I), in which

Y and Z independently of one another represent a radical $OX_2'$ or $RED_1'$, but where at least one Y represents $OX_2'$ and at least one Z represents $RED_1'$, where $OX_2'$ represents the radical of a reversibly electrochemically reducible redox system, and $RED_1'$ represents the radical of a reversibly electrochemically oxidizable redox system, B represents a bridge member, c represents an integer from 0 to 5, and a and b independently of one another represent an integer from 0 to 5, preferably an integer from 0 to 3 and b) at least one reducible substance $OX_2''$ which represents a cyclic organic compound which, after accepting 1 or 2 electrons, is converted, one of the σ bonds of the ring being broken, into an open-ring compound and which, by releasing 1 or 2 electrons, is converted once more into the cyclic starting compound, in each case precisely two electrons being transferred overall.

The ring opening may take place, for example, by two electrons being accepted directly, resulting in breaking of the bond. Alternatively it is possible for one electron to be accepted initially, whereupon ring opening takes place which may then be followed by further reactions such as a further electron and/or a proton being accepted and/or an anionic leaving group being eliminated, precisely 2 electrons being accepted overall, however. This ring opening results in an altered π electron system which has a corresponding higher-wavelength and/or higher-absorbance light absorption. Ring closure may correspondingly take place by simultaneous release of two electrons or successively by release of first one electron and possibly a further electron, and/or the proton which may have been bound is eliminated again and/or the eliminated anionic leaving group is bound once more, precisely 2 electrons being released overall, however.

Preferably, the electrochromic system comprises, as the couple $RED_1'/OX_2'$, at least one electrochromic system of the formula (1), in which Y represents $OX_2'$ and Z represents $RED_1'$ and Y and Z alternate in their sequential order.

Particularly preferably, the novel electrochromic system comprises, as the couple $RED_1'/OX_2'$ at least one electrochromic substance of the formulae $OX_2'$-B-$RED_1'$ (Ia), $OX_2'$-B-$RED_1'$-B-$OX_2'$ (Ib), $RED_1'$-B-$OX_2'$-B-$RED_1'$ (Ic), or $OX_2'$-(B-$RED_1'$-B-$OX_2'$)$_d$-B-$RED_1'$ (Id), in which
$OX_2'$, $RED_1'$ amd B have the abovementioned meanings, and
d represents an integer from 1 to 5.

Especially preferably, the novel electrochromic system comprises, as the couple $RED_2'/OX_1'$, at least one electrochromic substance of the formulae (Ia) to (Id), in which $OX_2'$ represents the radical of a cathodically reducible substance which in a cyclic voltammogram, recorded in an inert solvent at room temperature, exhibits at least two chemically reversible reduction waves, the first of these reduction waves leading to an increase in the absorbance at at least one wavelength in the visible range of the electromagnetic spectrum, $RED_1'$ represents the radical of the anodically reversibly oxidizable substance which in a cyclic voltammogram, recorded in an inert solvent at room temperature, exhibits at least two chemically reversible oxidation waves, the first of these oxidation waves leading to an increase in the absorbance at at least one wavelength in the visible range of the electromagnetic spectrum, and B represents a bridge member.

The reducible substance $OX_2''$ which is further comprised in the electrochromic system according to the invention and is converted reversibly, a ring σ bond being broken, into the corresponding open-ring substance $RED_2''$, is, in particular, a compound selected from the group consisting of the tetrazolium salts, benzo- or naphthotriazolium salts, cyclopropanes and [1.1.0]bicyclobutanes. As a result of electrons being accepted and bonds breaking, the corresponding colored compounds from the group consisting of the formazans, amino-azo-benzenes, amino-azo-naphthalenes, 1,3-dimethylenepropanes and 1,3-dimethylenecyclobutanes are then formed therefrom.

The tetrazolium salts, naphthotriazolium salts, cyclopropanes and [1.1.0]bicyclobutanes are preferably those compounds of the formulae (CI) to (CIV)

(CI)

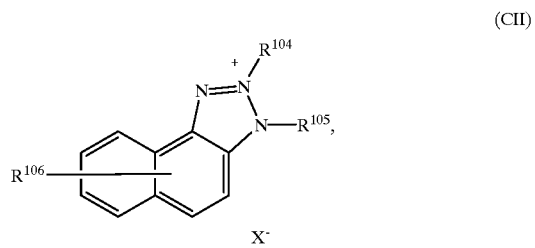

(CII)

(CIII)

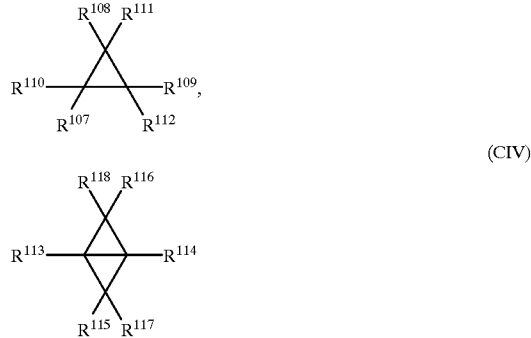

(CIV)

in which $R^{101}$ to $R^{105}$, independently of one another, represent $C_6$- to $C_{10}$-aryl or an aromatic or quasi-aromatic five- or six-membered heterocyclic ring, each of which is optionally benzanellated, $R^{107}$, $R^{109}$, $R^{113}$ and $R^{114}$, independently of one another, represent a radical of the formulae (CV) to (CVII)

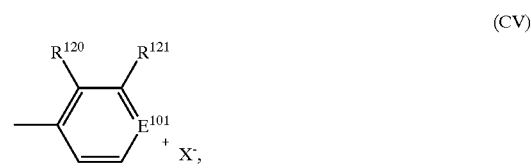

(CV)

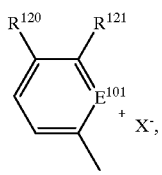

(CVI)

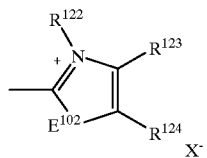

(CVII)

$R^{108}$, $R^{115}$ and $R^{116}$, independently of one another, represent $C_6$- to $C_{10}$-aryl or a radical of the formulae (CV) to (CVII), $R^{110}$ to $R^{112}$, $R^{117}$ and $R^{118}$, independently of one another, represent hydrogen, $C_1$- to $C_4$-alkyl, halogeno or cyano, $E^{101}$ and $E^{102}$, independently of one another, represent O, S or N—$R^{119}$, $R^{119}$ and $R^{122}$, independently of one another, represent $C_1$- to $C_{18}$-alkyl, $C_2$- to $C_8$-alkenyl, $C_4$- to $C_7$-cycloalkyl, $C_7$- to $C_{15}$-aralkyl or $C_6$- to $C_{10}$-aryl, $R^{106}$, $R^{120}$, $R^{121}$, $R^{123}$ and $R^{124}$, independently of one another, represent hydrogen, $C_1$- to $C_4$-alkyl, $C_1$- to $C_4$-alkoxy, halogeno, cyano, nitro or $C_1$- to $C_4$-alkoxycarbonyl, or $R^{120}$ and $R^{121}$, or $R^{123}$ and $R^{124}$, jointly form a —CH=CH—CH=CH— bridge, and X⁻ represents a colorless anion which is redox-inert under the conditions.

Particular preference is given to a novel electrochromic system which comprises as the couple $RED_1'/OX_2'$ at least one substance of the formula (Ia)–(Id), in which $OX_2'$ represents a radical of the formulae

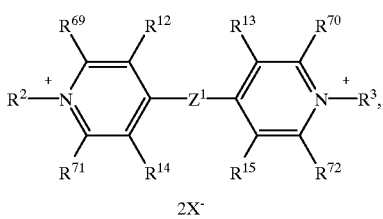

(II)

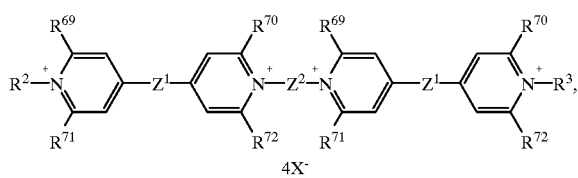

(III)

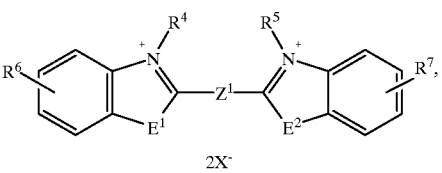

(IV)

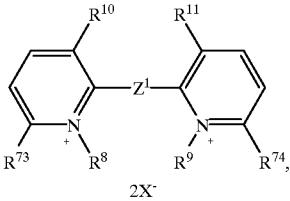

(V)

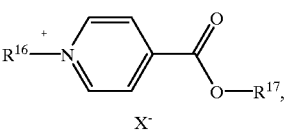

(VI)

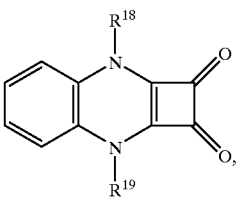

(VII)

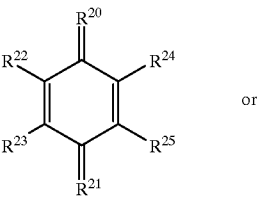

(VIII)

or

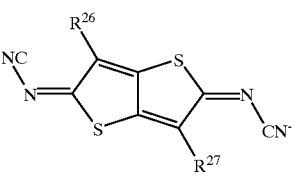

(IX)

in which $R^2$ to $R^5$, $R^8$, $R^9$, $R^{16}$ to $R^{19}$ independently of one another, represent $C_1$- to $C_{18}$-alkyl, $C_2$- to $C_{12}$-alkenyl, $C_3$- to $C_7$-cycloalkyl, $C_7$- to $C_{15}$-aralkyl or $C_6$- to $C_{10}$-aryl, or $R^4$ and $R^5$ or $R^8$ and $R^9$ jointly form a —(CH$_2$)$_2$— or —(CH$_2$)$_3$— bridge, $R^6$, $R^7$ and $R^{22}$ to $R^{25}$, independently of one another, represent hydrogen, $C_1$–$C_4$-alkyl, $C_1$–$C_4$-alkoxy, halogeno, cyano, nitro or $C_1$- to $C_4$-alkoxycarbonyl or $R^{22}$ and $R^{23}$ and/or $R^{24}$ and $R^{25}$ form a —CH=CH—CH=CH— bridge, $R^{10}$ and $R^{11}$; $R^{12}$ and $R^{13}$; $R^{14}$ and $R^{15}$, independently of one another, represent hydrogen or pairwise a —(CH$_2$)$_2$—, —(CH$_2$)$_3$— or —CH=CH— bridge, $R^{20}$ and $R^{21}$, independently of one another, represent O, N—CN, C(CN)$_2$ or N—$C_6$- to $C_{10}$-aryl, $R^{26}$ represents hydrogen, $C_1$- to $C_4$-alkyl, $C_1$- to $C_4$-alkoxy, halogeno, cyano, nitro, $C_1$- to $C_4$-alkoxycarbonyl or $C_6$- to $C_{10}$-aryl, $R^{69}$ to $R^{74}$, independently of one another, represent hydrogen or $C_1$- to $C_6$-alkyl, or $R^{69}$; $R^{12}$ and/or $R^{70}$; $R^{13}$ each jointly form a —CH=CH—CH=CH— bridge, $E^1$ and $E^2$, independently of one another, represent O, S, $NR^1$ or $C(CH_3)_2$ or $E^1$ and $E^2$ jointly form an —N—$(CH_2)_2$—N-bridge, $R^1$ represents $C_1$- to $C_{18}$-alkyl, $C_2$- to $C_{12}$-alkenyl, $C_4$- to $C_7$-cycloalkyl, $C_7$- to $C_{15}$-aralkyl, $C_6$- to $C_{10}$-aryl, $Z^1$ represents a direct bond, —CH=CH—, —C(CH$_3$)=CH—, —C(CN)=CH—, —CCl=CCl—, —C(OH)=CH—, —CCl=CH—, —C≡C—, —CH=N—N=CH—, —C(CH$_3$)=N—N=C(CH$_3$)— or —CCl=N—N=CCl—, $Z^2$ represents —(CH$_2$)$_r$— or —CH$_2$—C$_6$H$_4$—CH$_2$—, r represents an integer from 1 to 10, X⁻ represents an anion which is redox-inert under the conditions, the bond to the bridge member B being effected via one of the radicals $R^2$–$R^{19}$, $R^{22}$–$R^{27}$ or, in the case where $E^1$ or $E^2$ represent $NR^1$, being effected via $R^1$ and the said radicals then represent a direct bond, $RED_1'$ represents one of the following radicals

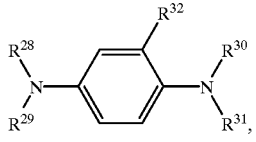 (X)

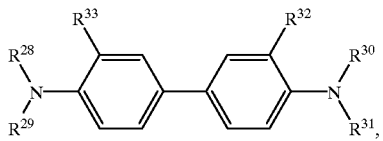 (XI)

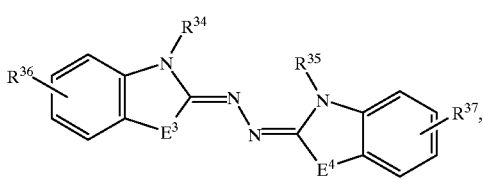 (XII)

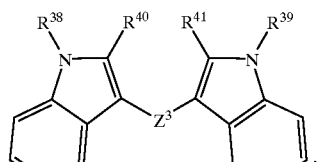 (XIII)

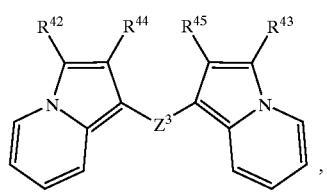 (XIV)

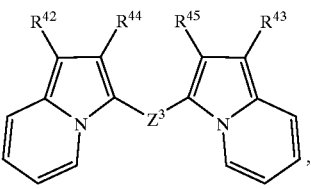 (XV)

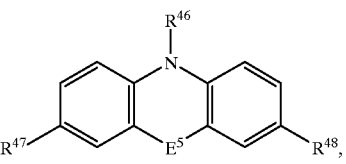 (XVI)

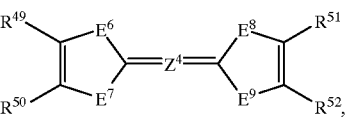 (XVII)

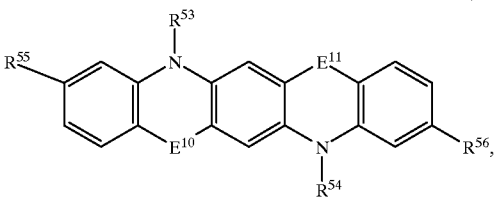 (XVIII)

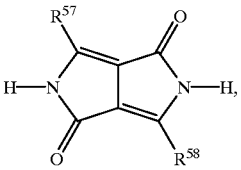 (XIX)

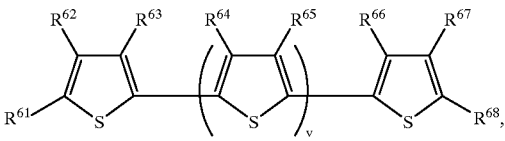 (XX)

in which $R^{28}$ to $R^{31}$, $R^{34}$, $R^{35}$, $R^{38}$, $R^{39}$, $R^{46}$, $R^{53}$ and $R^{54}$, independently of one another, represent $C_1$- to $C_{18}$-alkyl, $C_2$- to $C_{12}$-alkenyl, $C_3$- to $C_7$-cycloalkyl, $C_7$- to $C_{15}$-aralkyl or $C_6$- to $C_{10}$-aryl, $R^{32}$, $R^{33}$, $R^{36}$, $R^{37}$, $R^{40}$, $R^{41}$, $R^{42}$ to $R^{45}$, $R^{47}$, $R^{48}$, $R^{49}$ to $R^{52}$ and $R^{55}$ to $R^{57}$, independently of one another, represent hydrogen, $C_1$–$C_4$-alkyl, $C_1$–$C_4$-alkoxy, halogeno, cyano, nitro, $C_1$- to $C_4$-alkoxycarbonyl or $C_6$- to $C_{10}$-aryl, $R^{49}$ and $R^{50}$ and/or $R^{51}$ and $R^{52}$ form a —(CH$_2$)$_3$—, —(CH$_2$)$_4$—, —(CH$_2$)$_5$— or —CH=CH—CH=CH— bridge, $Z^3$ represents a direct bond, a —CH=CH— or —N=N— bridge, =$Z^4$= represents a direct double bond, a =CH—CH= or =N—N= bridge, $E^3$ to $E^5$, $E^{10}$ and $E^{11}$, independently of one another, represent O, S, $NR^{59}$ or $C(CH_3)_2$, or $E^3$ and $E^4$, independently of one another, represent —CH=CH—, $E^6$ to $E^9$ independently of one another, represent S, Se or $NR^{59}$, $R^{59}$ represents $C_1$- to $C_{12}$-alkyl, $C_2$- to $C_8$-alkenyl, $C_5$- to $C_7$-cycloalkyl, $C_7$- to $C_{15}$-aralkyl or $C_6$- to $C_{10}$-aryl, $R^{61}$ to $R^{68}$, independently of one another, represent hydrogen, $C_1$- to $C_6$-alkyl, $C_1$- to $C_4$-alkoxy, cyano, $C_1$- to $C_4$-alkoxycarbonyl or $C_6$- to $C_{10}$-aryl or $R^{61}$; $R^{62}$ and $R^{67}$; $R^{68}$, independently of one another, jointly form a —$(CH_2)_3$—, —$(CH_2)_4$— or —CH=CH—CH=CH— bridge, v represents an integer from 0 and 10, the bond to the bridge member B being effected by one of the radicals $R^{28}$–$R^{58}$, $R^{61}$, $R^{62}$, $R^{67}$, $R^{68}$ or, in the case where one of the radicals $E^3$–$E^{11}$ represents $NR^{59}$, being effected via $R^{59}$ and the said radicals then representing a direct bond, B represents a bridge member of the formulae —$(CH_2)_n$— or —$[Y^1{}_s(CH_2)_m-Y^2]_o$—$(CH_2)_p$—$Y_p$—$Y^3{}_q$—, each of which may be substituted by $C_1$- to $C_4$-alkoxy, halogeno or phenyl, $Y^1$ to $Y^3$, independently of one another, represent O, S, $NR^{60}$, COO, CONH, NHCONH, cyclopentanediyl, cyclohexanediyl, phenylene or naphthylene, $R^{60}$ represents $C_1$- to $C_6$-alkyl, $C_2$- to $C_6$-alkenyl, $C_4$- to $C_7$-cycloalkyl, $C_7$- to $C_{15}$-aralkyl or $C_6$- to $C_{10}$-aryl, n represents an integer from 1 to 12, m and p, independently of one another, represent an integer from 0 to 8, o represents an integer from 0 to 6 and q and s, independently of one another, represent 0 or 1.

Preference is given to those compounds $OX_2''$ of the formulae (CI) to (CIV), in which $R^{101}$ to $R^{105}$, independently of one another, represent a radical of the formulae

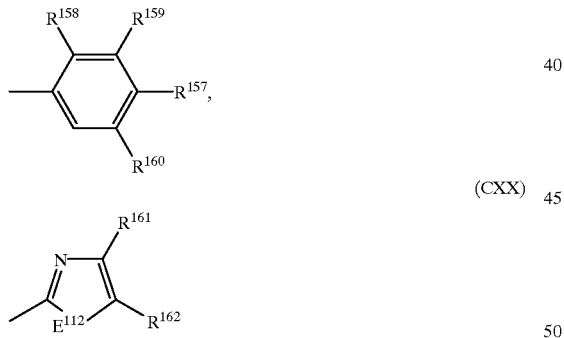

(CXIX)

(CXX)

in which $R^{157}$ to $R^{162}$, independently of one another, represent hydrogen, $C_1$- to $C_6$-alkyl, $C_1$- to $C_6$-alkoxy, halogeno, cyano, nitro, di-($C_1$- to $C_4$-alkyl)amino, tri-($C_1$- to $C_4$-alkly)ammonium, $C_1$- to $C_4$-alkoxycarbonyl or COOH or radicals positioned pairwise next to one another jointly form an —O—$(CH_2)_{2-3}$—, —O—$(CH_2)_{1-2}$—O—, $NR^{163}$—$(CH_2)_{2-3}$— or —$NR^{163}$—$(CH_2)_{1-2}$—O— bridge or $R^{158}$ and $R^{159}$ and/or $R^{161}$ and $R^{162}$ form a —CH=CH—CH=CH— bridge which may be substituted by methyl, methoxy or chloro, $R^{163}$ represents hydrogen or $C_1$- to $C_4$-alkyl, $E^{112}$ represents O, S or $NR^{64}$, $R^{164}$ represents hydrogen, $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl, $R^{107}$, $R^{109}$, $R^{113}$ and $R^{114}$ represent a radical of the formula (CV) and are pairwise identical, $R^{108}$, $R^{115}$ and $R^{116}$ represent phenyl or a radical of the formula (CV) and $R^{115}$ and $R^{116}$ are identical, $R^{106}$, $R^{110}$ and $R^{112}$ represent hydrogen, $R^{111}$ represents hydrogen, methyl, cyano or chloro, $R^{117}$ and $R^{118}$ represent hydrogen or methyl and are identical, $E^{101}$ represents O or $NR^{119}$, $R^{119}$ represents $C_1$- to $C_{12}$-alkyl, $C_2$- to $C_4$-alkenyl, cyclohexyl, benzyl or phenyl, $R^{120}$ and $R^{121}$ represent hydrogen or jointly form a —CH=CH—CH=CH— bridge, and $X^-$ forms a colorless anion which is redox-inert under the conditions.

Especial preference is given to a novel electrochromic system which comprises a) as the couple $RED_1'/OX_2'$ at least one substance of the formula (Ia)–(Id), in which $OX_2'$ represents a radical of the formulae (II), (III), (IV) or (V), in which $R^2$, $R^3$, $R^4$, $R^5$, $R^8$ and $R^9$, independently of one another, represent $C_1$- to $C_{12}$-alkyl, $C_2$- to $C_8$-alkenyl, $C_5$- to $C_7$-cycloalkyl, $C_7$- to $C_{15}$-aralkyl or $C_6$- to $C_{10}$-aryl, $R^6$ and $R^7$, independently of one another, represent hydrogen, methyl, ethyl, methoxy, ethoxy, fluoro, chloro, bromo, cyano, nitro, methoxycarbonyl or ethoxycarbonyl, $R^{10}$, $R^{11}$; $R^{12}$, $R^{13}$ and $R^{14}$, $R^{15}$, independently of one another, represent hydrogen or, if $Z^1$ represents a direct bond, in each case jointly represents a —$(CH_2)_2$—, —$(CH_2)_3$— or —CH=CH— bridge, or $R^4$, $R^5$ and $R^8$, $R^9$, independently of one another, pairwise jointly represent a —$(CH_2)_2$— or —$(CH_2)_3$— bridge, if $Z^1$ represents a direct bond, $R^{69}$ to $R^{74}$, independently of one another, represent hydrogen or $C_1$- to $C_4$-alkyl, $E^1$ and $E^2$ are identical and represent O, S, $NR^1$ or $C(CH_3)_2$ or jointly form an —N—$(CH_2)_2$—N— bridge, $R^1$ represents $C_1$- to $C_{12}$-alkyl, $C_2$- to $C_4$-alkenyl, $C_5$- to $C_7$-cycloalkyl, $C_7$- to $C_{15}$-aralkyl or $C_6$- to $C_{10}$-aryl, $Z^1$ represents a direct bond, —CH=CH—, —C($CH_3$)=CH—, —C(CN)=CH—, —C≡C— or —CH=N—N=CH—, $Z^2$ represents —$(CH)_r$— or —$CH_2$—$C_6H_4$—$CH_2$—, r represents an integer between 1 and 6, $X^-$ represents a colorless anion which is redox-inert under the conditions, the bond to the bridge member B being effected via one of the radicals $R^2$–$R^{11}$ or, in the case where $E^1$ or $E^2$ represents $NR^1$, being effected via $R^1$ and the said radicals then representing a direct bond, $RED_1'$ represents a radical of the formulae (X), (XI), (XII), (XIII), (XVI), (XVII), (XVIII) or (XX), in which $R^{28}$, $R^{29}$ to $R^{31}$, $R^{34}$, $R^{35}$, $R^{38}$, $R^{39}$, $R^{46}$, $R^{53}$ and $R^{54}$, independently of one another, represent $C_1$- to $C_{12}$-alkyl, $C_2$- to $C_8$-alkenyl, $C_5$- to $C_7$-cycloalkyl, $C_7$- to $C_{15}$-aralkyl or $C_6$- to $C_{10}$-aryl, $R^{32}$, $R^{33}$, $R^{36}$, $R^{37}$, $R^{40}$, $R^{41}$, $R^{47}$, $R^{48}$, $R^{49}$, $R^{50}$ to $R^{52}$, $R^{55}$ and $R^{56}$, independently of one another, represent hydrogen, methyl, ethyl, methoxy, ethoxy, fluoro, chloro, bromo, cyano, nitro, methoxycarbonyl, ethoxycarbonyl or phenyl, $Z^3$ represents a direct bond, a —CH=CH— or —N=N— bridge, =$Z^4$= represents a direct double bond, a =CH—CH= or =N—N= bridge, $E^3$ to $E^5$, $E^{10}$ and $E^{11}$, independently of one another, represent O, S, $N^{59}$ or $C(CH_3)_2$, but $E^3$ and $E^4$ have identical meanings, $E^6$ to $E^9$, are identical to one another and represent S, Se or $NR^{59}$ or $E^6$ represents $NR^{59}$, where $R^{59}$ represents a direct bond to the bridge B and $E^7$ to $E^9$ have the abovementioned meanings, but need not be identical to one another, $R^{59}$ represents $C_1$- to $C_{12}$-alkyl, $C_2$- to $C_8$-alkenyl, $C_5$- to $C_7$-cycloalkyl, $C_7$- to $C_{15}$-aralkyl or $C_6$- to $C_{10}$-aryl, $R^{61}$, $R^{62}$ and $R^{67}$, $R^{68}$ independently of one another, represent hydrogen, $C_1$- to $C_4$-alkyl, methoxycarbonyl, ethoxycarbonyl or phenyl or, pairwise jointly, represent a —$(CH_2)_3$— or —$(C_2)_4$— bridge, $R^{63}$ to $R^{66}$ represent hydrogen and v represents an integer from 1 to 6, the bond to the bridge member B being effected by one of the radicals $R^{28}$–$R^{41}$, $R^{46}$–$R^{56}$, $R^{61}$, $R^{62}$, $R^{67}$, $R^{68}$ or, in the case where one of the radicals $E^3$–$E^{11}$ represents $NR^{59}$, being effected via $R^{59}$ and the said radicals then representing a direct bond, B represents a bridge member of the formulae —$(CH_2)_n$—, —$(CH_2)_m$—O—$(CH_2)_p$—, —$(CH)_m$—$NR^{60}$—$(CH_2)_p$—, —$(CH_2)_m$—$C_6H_4$—$(CH_2)_p$—, —[O—$(CH_2)_p$]$_o$—O—, —[$NR^{60}$—$(CH_2)_p$]$_o$—$NR^{60}$—, —[$C_6H_4$—$(CH_2)_p$]$_o$—$C_6H_4$—, —$(CH_2)_m$—OCO—$C_6H_4$—COO—$(CH_2)_p$—, —$(CH_2)_m$—NHCO—$C_6H_4$—CONH—$(CH_2)_p$—, —$(CH_2)_m$—NHCONH—$C_6H_4$—NHCONH—$(CH_2)_p$—, —$(CH_2)_m$—OCO—$(CH_2)_t$—COO—$(CH_2)_p$—, —$(CH_2)_m$—NHCO—$(CH_2)_t$—CONH—$(CH)_p$—, —$(CH_2)_m$—NHCONH—$(CH_2)_t$—NHCONH—$(CH_2)_p$—, $R^{60}$ represents methyl, ethyl, benzyl or phenyl, n represents an integer from 1 to 10, m and p, independently of one another, represent an integer from 0 to 4, o represents an integer from 0 to 2 and t represents an integer from I to 6 and b) as the substance $OX_2''$ comprises at least one tetrazolium salt of the formula (CI), in which $R^{101}$ and $R^{102}$ correspond to a radical of formula (CXIX), $R^{103}$ corresponds to a radical of formula (CXX), $R^{157}$, $^{159}$ and $R^{160}$, independently of one another, represent hydrogen, methyl, ethyl, methoxy, ethoxy, cyano, nitro, —$N^+(CH_3)_3$ or COOH, or $R^{157}$ and $R^{159}$ jointly form an —O—$CH_2$—O— bridge, $R^{158}$ represents hydrogen, methyl, methoxy or chloro, $R^{161}$ represents methyl, difluoromethyl, trifluoromethyl, methoxycarbonyl, ethoxycarbonyl or phenyl, $R^{162}$ represents hydrogen, methyl, ethyl, phenyl or chloro, or $R^{161}$ and $R^{162}$ jointly form a —CH=CH—CH=CH— or —CH=CH—C(OCH$_3$)=CH— bridge, $E^{112}$ represents S, $X^-$ represents a colorless anion which is redox-inert under the conditions.

Particular preference is given to a novel electrochromic system which comprises a) as the couple $RED_1'/OX_2'$, at least one substance of the formulae (Ia)–(Id), in which $OX_2'$ represents a radical of the formula (II), (IV) or (V), in which $R^2$, $R^4$ and $R^8$ represent a direct bond to the bridge member B, $R^3$, $R^5$ and $R^9$, independently of one another, represent methyl, ethyl, propyl, butyl, pentyl, hexyl, heptyl, octyl, benzyl or phenyl or, in the case of the formulae Ic or Id likewise represent a direct bond to the bridge member B, $R^6$ and $R^7$ are identical and represent hydrogen, methyl, methoxy, chloro, cyano or methoxycarbonyl, $R^{10}$, $R^{11}$; $R^{12}$, $R^{13}$ and $R^{14}$, $R^{15}$, independently of one another, represent hydrogen or, if $Z^1$ represents a direct bond, in each case pairwise jointly represent a —CH=CH— bridge, $R^{69}$ to $R^{72}$ are identical and represent hydrogen, methyl or ethyl, $R^{73}$ and $R^{74}$ represent hydrogen, $E^1$ and $E^2$ are identical and represent O or S, $Z^1$ represents a direct bond or —CH=CH—, $X^1$ represents a colorless anion which is redox-inert under the conditions, $RED_1'$ represents a radical of the formulae (X), (XII), (XIII), (XVI) or (XVII), $R^{28}$, $R^{34}$, $R^{38}$, $R^{46}$ and $R^{49}$ represent a direct bond to the bridge member B, $R^{29}$ to $R^{31}$, $R^{35}$ and $R^{39}$, independently of one another, represent methyl, ethyl, propyl, butyl, pentyl, hexyl, heptyl, octyl, benzyl or phenyl or, in the case of the formulae Ib or Id, $R^{30}$, $R^{35}$ and $R^{39}$ likewise represent the direct bond to the bridge member B, $R^{32}$, $R^{47}$ and $R^{48}$ represent hydrogen, $R^{36}$, $R^{37}$, $R^{40}$, $R^{41}$ and $R^{50}$ to $R^{52}$, independently of one another, represent hydrogen, methyl, methoxy, chloro, cyano, methoxycarbonyl or phenyl or, in the case of the formula, Ib or Id, $R^{51}$ likewise represents a direct bond to the bridge member B, $Z^3$ represents a direct bond, a —CH=CH— or —N=N— bridge, =$Z^4$= represents a direct double bond, a =CH—CH= or =N—N= bridge, $E^3$ to $E^5$, independently of one another, represent O, S or $NR^{59}$, but $E^3$ and $E^4$ have identical meanings, $E^6$ to $E^9$, are identical to one another and represent S, Se or $NR^{59}$, $R^{59}$ represents methyl, ethyl, propyl, butyl, pentyl, hexyl, heptyl, octyl, benzyl or phenyl or, in the case of the formula XVI in Ib or Id likewise represents a direct bond to the bridge member B, B represents a bridge member of the formulae —$(CH_2)_n$—, —$(CH_2)_m$—O—$(CH_2)_p$—, —$(CH_2)_m$ —NR$^{60}$—(CH$_2$)$_p$—, —(CH$_2$)$_m$—C$_6$H$_4$—(CH$_2$)$_p$—,
—O—(CH$_2$)$_p$—O—, —NR$^{60}$—(CH$_2$)$_p$—NR$^{60}$—,
—(CH$_2$)$_m$—OCO—C$_6$H$_4$—COO—(CH$_2$)$_p$—,
—(CH$_2$)$_m$—NHCO—C$_6$H$_4$—CONH—(CH$_2$)$_p$—,
—(CH$_2$)$_m$—NHCONH—C$_6$H$_4$—NHCONH—(CH$_2$)$_p$—, —(CH$_2$)$_m$—OCO—(CH)$_t$—COO—(CH$_2$)$_p$—, —(CH$_2$)$_m$—NHCO—(CH$_2$)$_t$—CONH—(CH$_2$)$_p$—, —(CH$_2$)$_m$—NHCONH—(CH$_2$)$_t$—NHCONH—(CH$_2$)$_p$—,
R$^{60}$ represents methyl,
n represents an integer from 1 to 10, m and p are identical and represent an integer from 0 to 2 and
t represents an integer from 1 to 6 and, b) as the substance OX$_2$" comprises at least one substance of the formula (CI).

Especially preferred is a novel electrochromic system which comprises a) as the couple RED$_1$'/OX$_2$', at least one substance of the formula (Ia) corresponding to one of the formulae

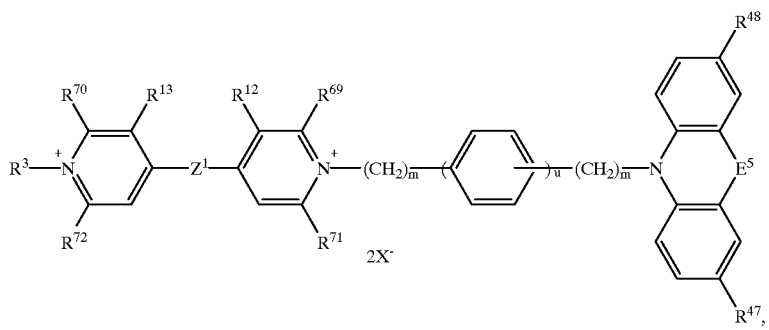

(XXI)

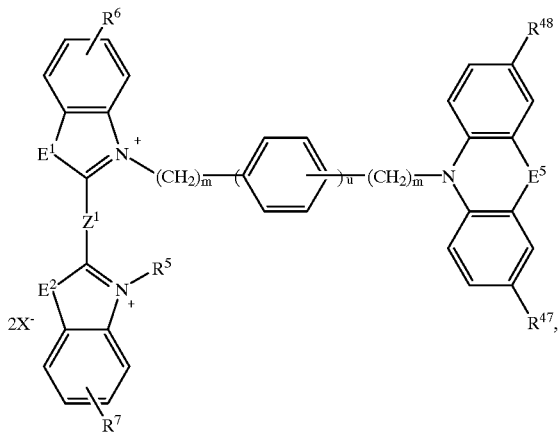

(XXII)

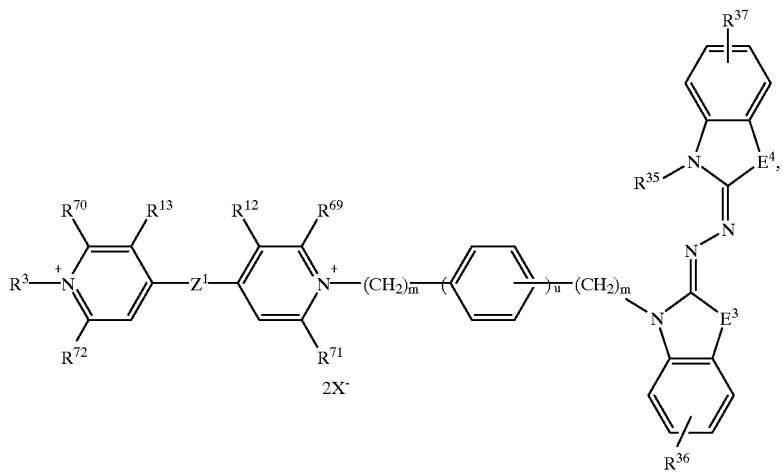

(XXIII)

-continued
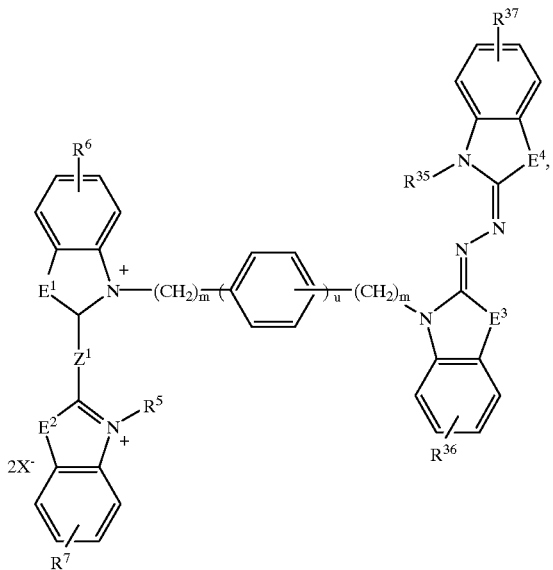
(XXIV)
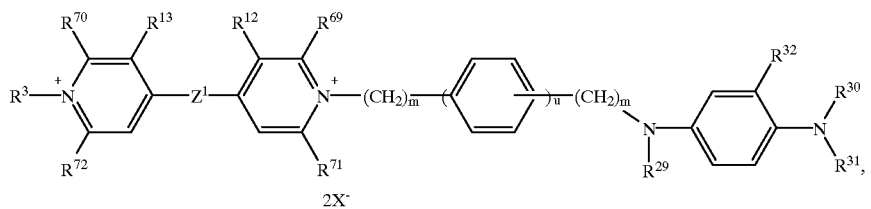
(XXV)
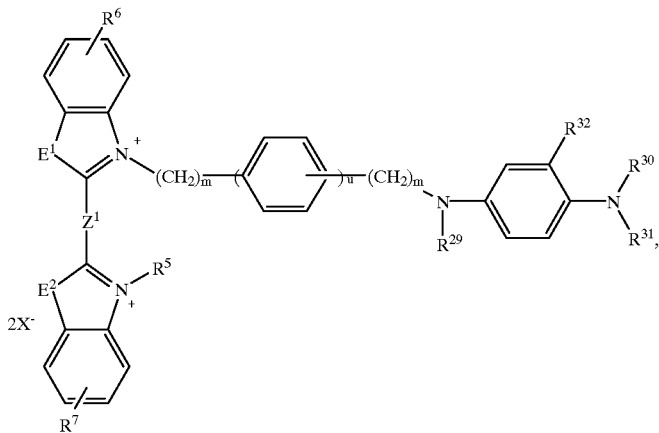
(XXVI)
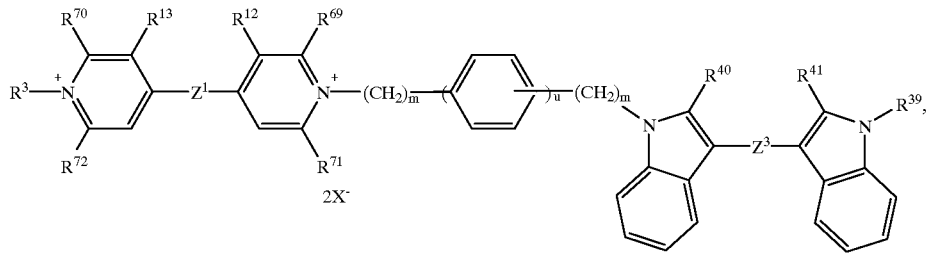
(XXVII)

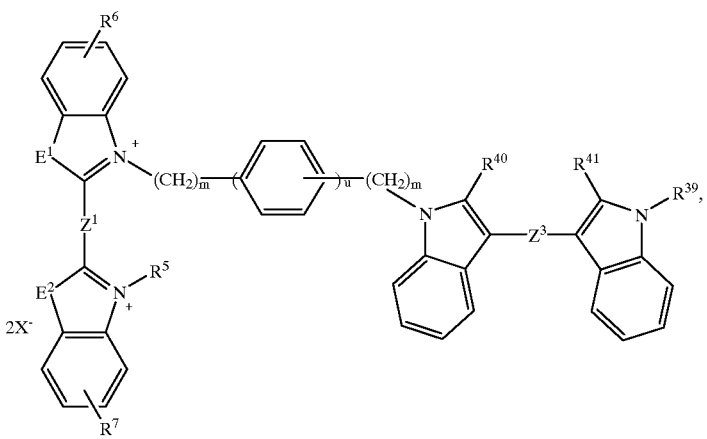
(XXVIII)
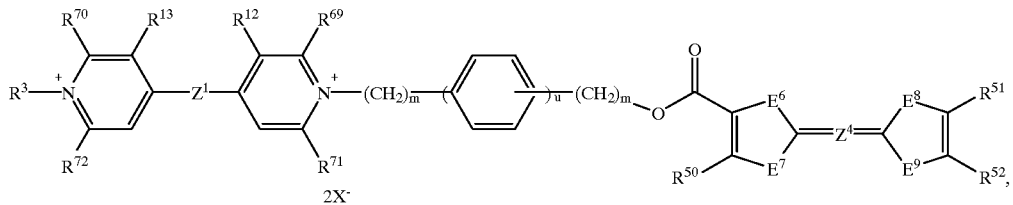
(XXIX)
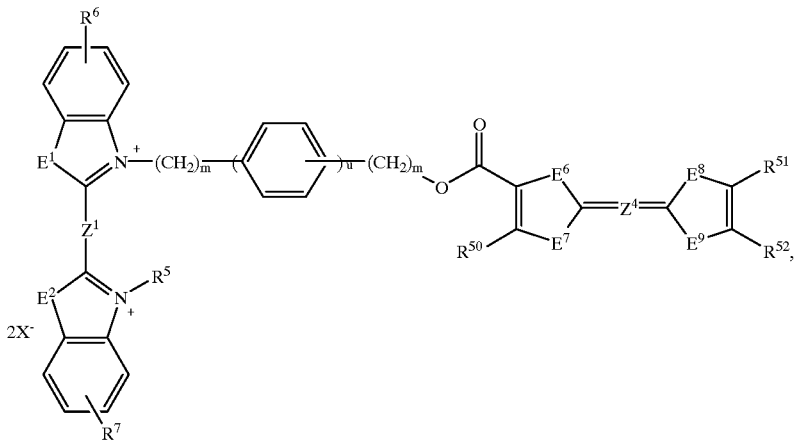
(XXX)
or at least one substance of the formula (Ib) corresponding to one of the formulae
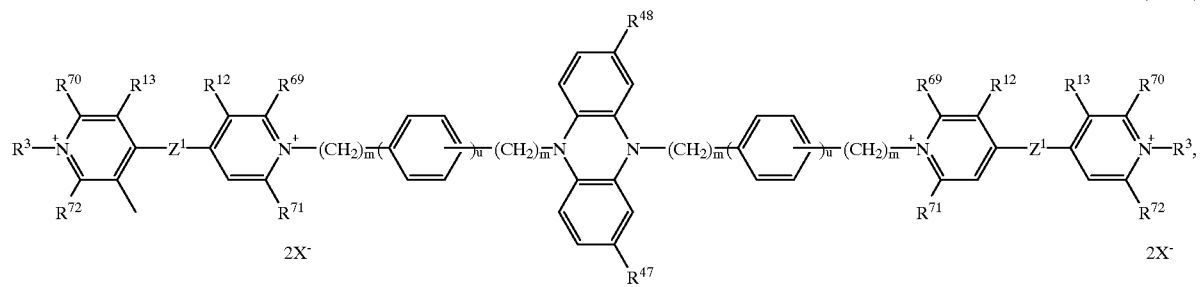
(XXXI)

-continued
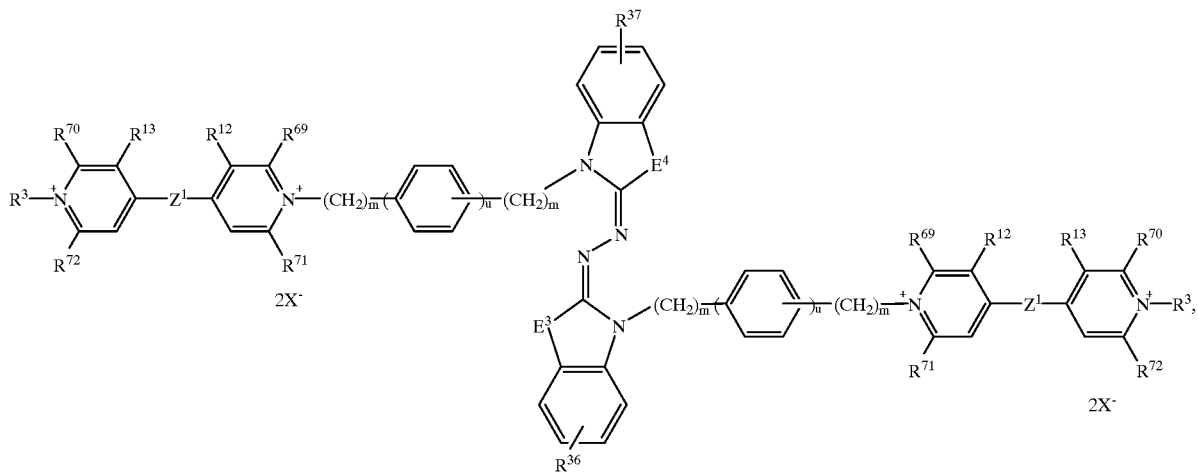
(XXXII)
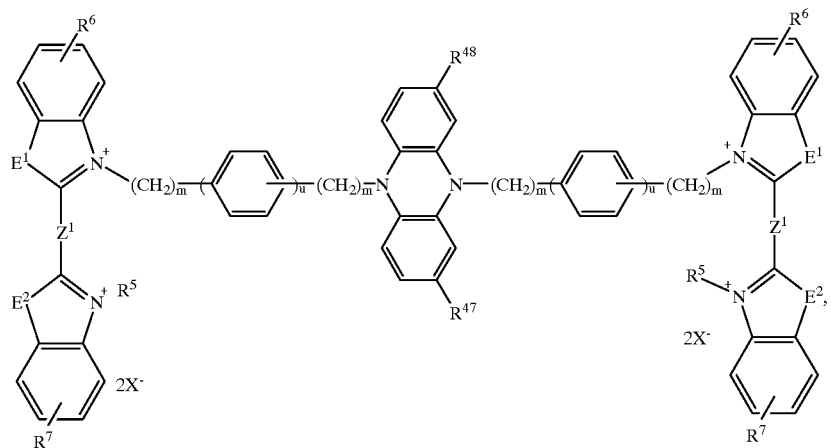
(XXXIII)
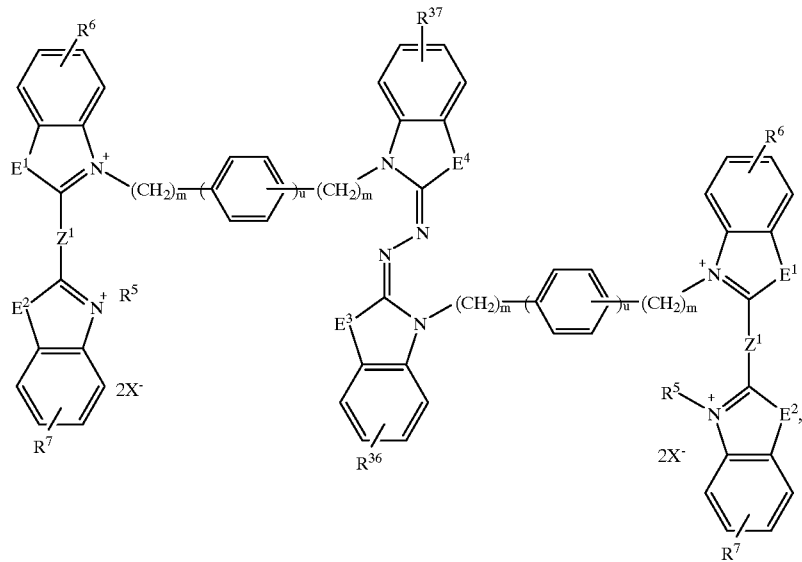
(XXXIV)

-continued
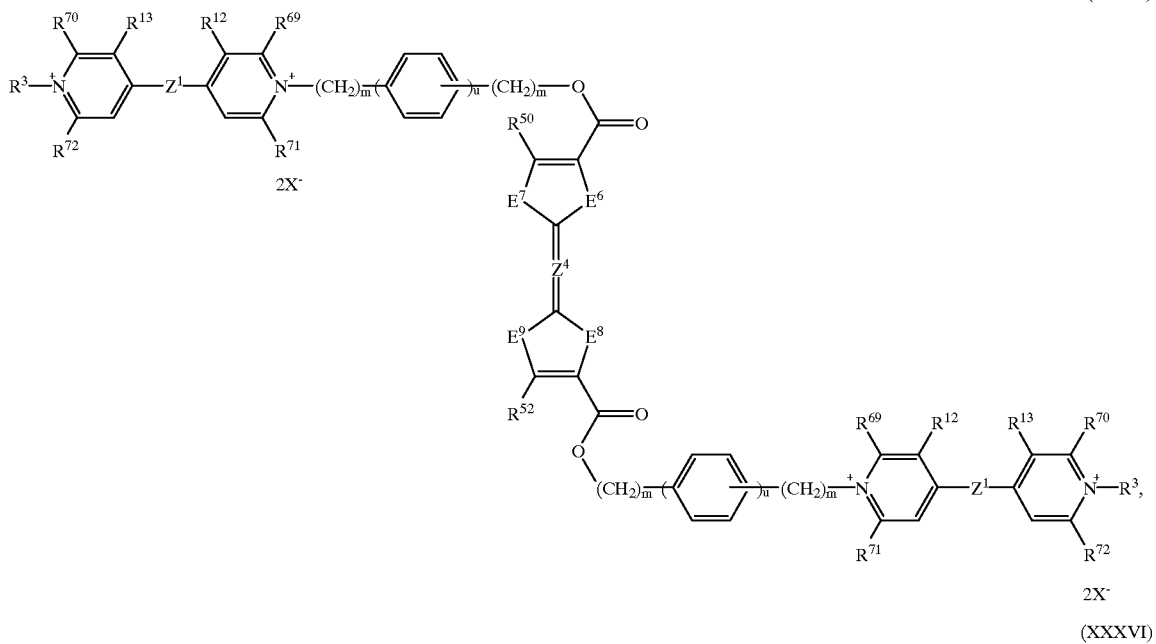
(XXXV)
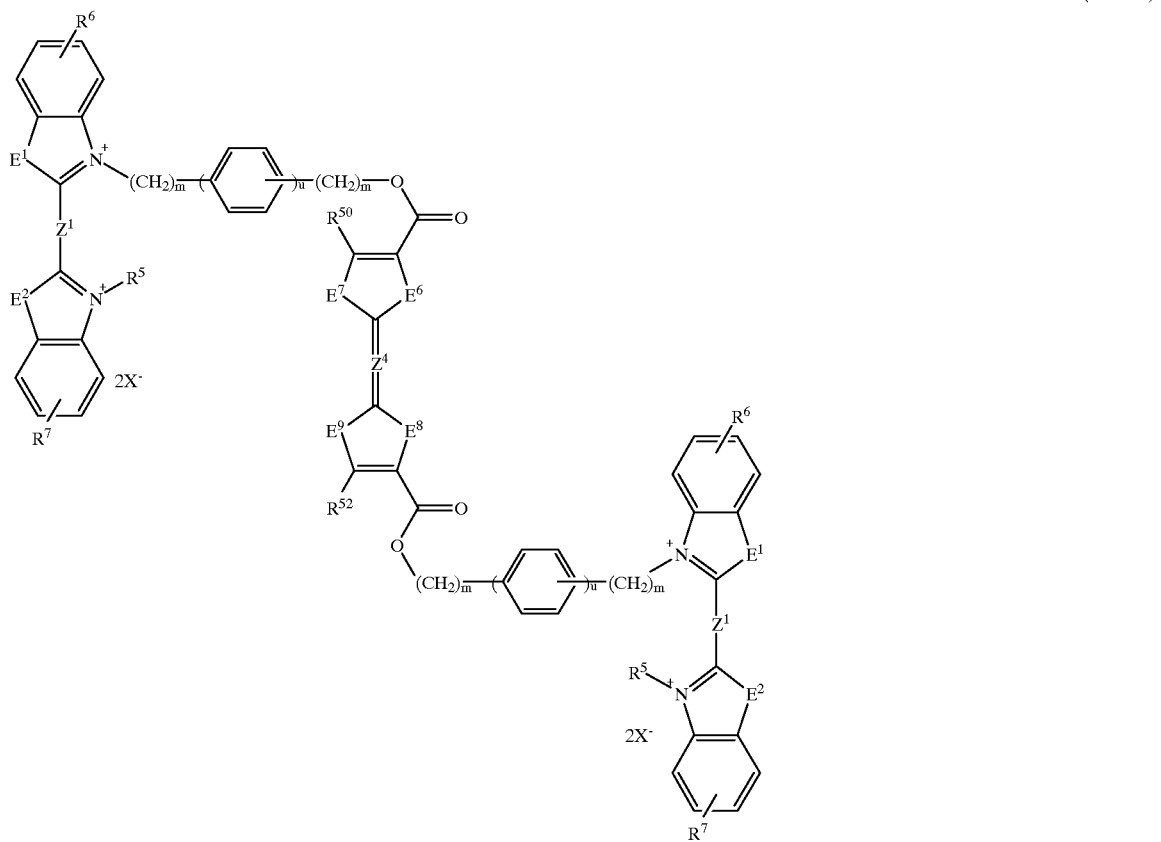
(XXXVI)

or at least one substance of the formula (Ic) corresponding to one of the formulae
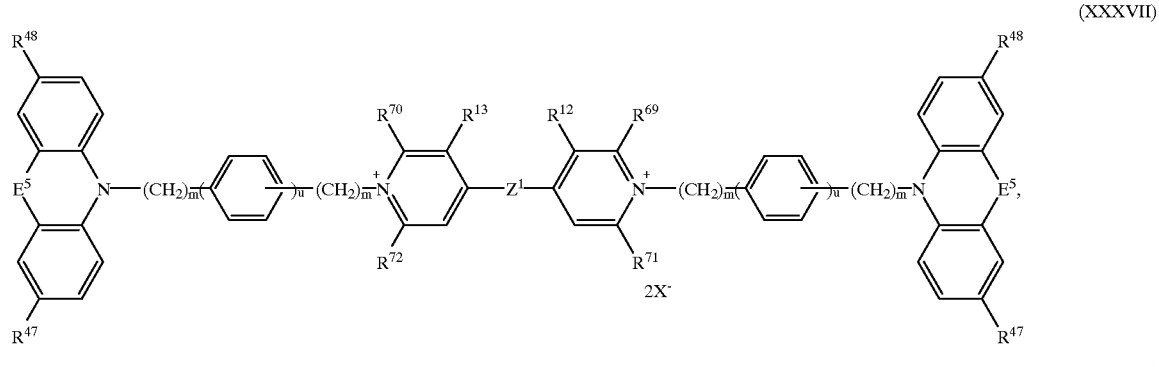
(XXXVII)
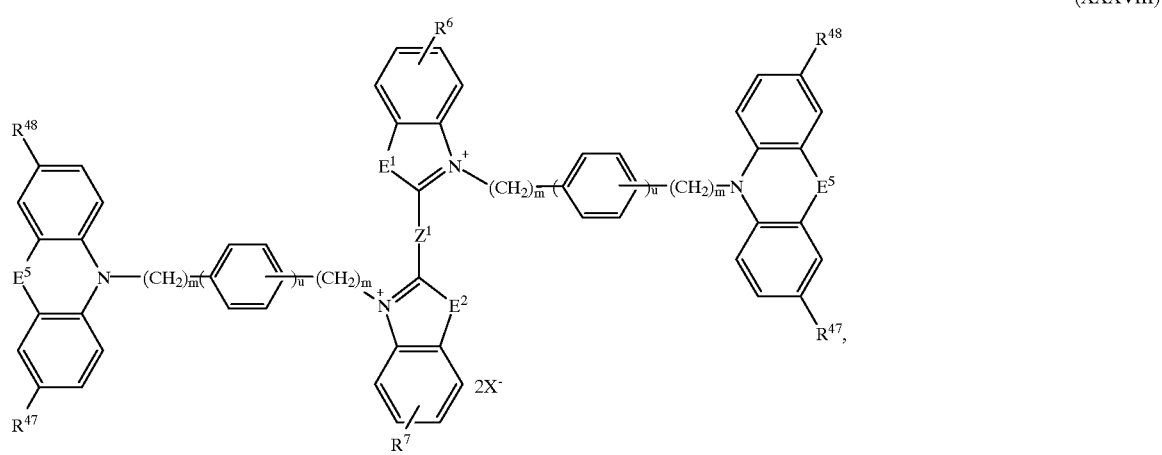
(XXXVIII)
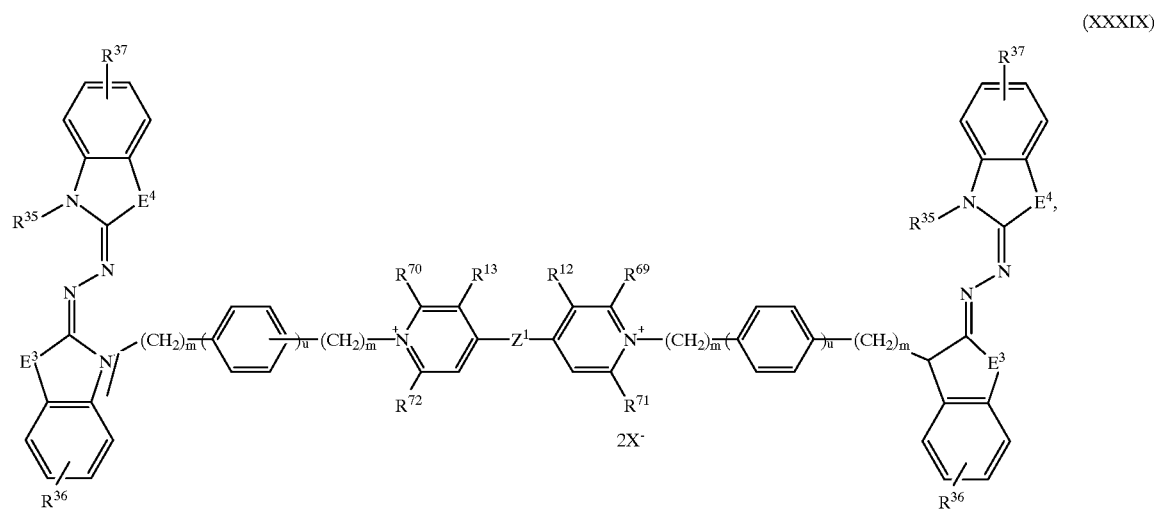
(XXXIX)

(XL)
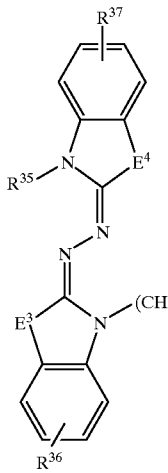 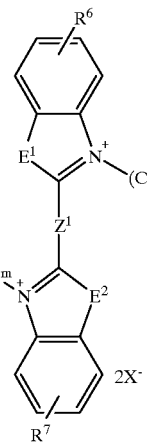 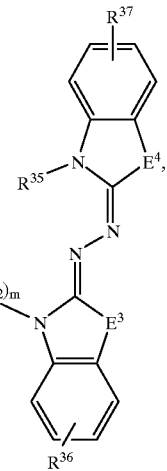
(XLI)
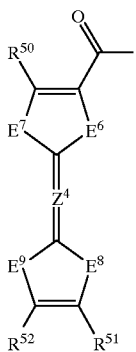 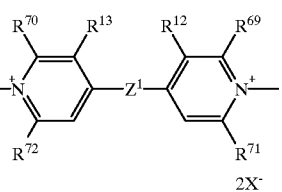 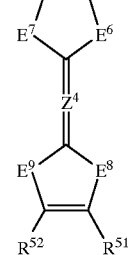
(XLII)
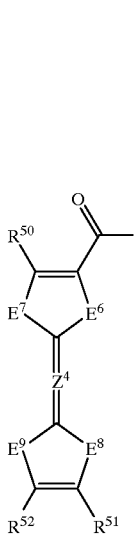 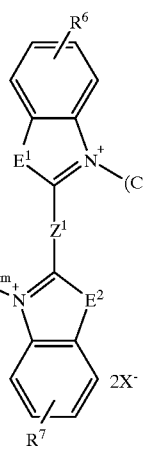 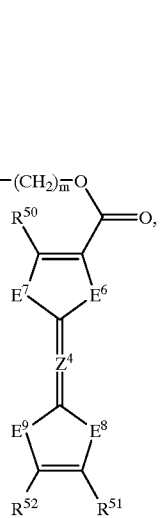

in which
- $R^3$, $R^5$, $R^{35}$ and $R^{39}$, independently of one another, represent methyl, ethyl, propyl, butyl, pentyl, hexyl or benzyl,
- $R^6$, $R^7$ and $R^{36}$, $R^{37}$ are pairwise identical and represent hydrogen, methyl, methoxy, chloro, cyano or methoxycarbonyl,
- $R^{12}$ and $R^{13}$ represent hydrogen or, if $Z^1$ represents a direct bond, jointly represent a CH=CH bridge,
- $R^{69}$ to $R^{72}$ are identical and represent hydrogen or methyl,
- $E^1$ and $E^2$ are identical and represent O or S,
- $Z^1$ represents a direct bond or —CH=CH—,
- $R^{32}$, $R^{47}$ and $R^{48}$ represent hydrogen,
- $E^3$ to $E^5$, independently of one another, represent O, S, or $NR^{59}$, $E^3$ and $E^4$ being identical, however,
- $R^{29}$ to $R^{31}$ and $R^{59}$, independently of one another, represent methyl, ethyl, propyl, butyl, pentyl, hexyl or benzyl, $R^{29}$ to $R^{31}$ preferably being identical,
- $R^{40}$ and $R^{41}$ are identical and represent hydrogen, methyl, ethyl, propyl, butyl or phenyl,
- $Z^3$ represents a direct bond, —CH=CH— or —N=N—;
- $R^{50}$ to $R^{52}$, independently of one another, represent hydrogen, methyl, methoxy, chloro, cyano, methoxycarbonyl, ethoxycarbonyl or phenyl, but are preferably identical,
- $E^6$ to $E^9$ are identical to one another and represent S, Se or $NR^{59}$,
- $Z^4$ represents a direct double bond, a =CH—CH= or =N—N= bridge,
- m represents an integer from 1 to 5,
- u represents 0 or 1 and
- $X^-$ represents a colorless anion which is redox-inert under the conditions, where the representation

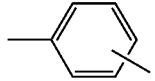

in the above-specified formulae represents a link in the o-, m- or p- position, and b) comprises, as the substance $OX_2''$, at least one substance of the formula (CI).

Couples of electrochromic substances $RED_1'/OX_2'$ which are covalently linked to one another via a bridge are a subject matter of the German application no. 19 605 451, unpublished at the priority date of the present invention, and can be prepared as described therein.

The electrochromic substances $RED_1''$ and $OX_2''$ are a subject matter of the German application no. 19 605 448, unpublished at the priority date of the present invention, and can be prepared as described therein.

In the abovementioned meanings of the substituents, alkyl radicals including modified ones such as e.g. alkoxy or aralkyl radicals are preferably those having from 1 to 12 C atoms, in particular having from 1 to 8 C atoms, unless specified otherwise. They may be straight-chain or branched and optionally carry further substituents such as e.g. $C_1$- to $C_4$-alkoxy, fluoro, chloro, hydroxy, cyano, $C_1$- to $C_4$-alkoxycarbonyl or COOH.

Cycloalkyl radicals are preferably to be understood as those having from 3 to 7 C atoms, in particular 5 or 6 C atoms.

Alkenyl radicals are preferably those having from 2 to 8 C atoms, in particular from 2 to 4 C atoms.

Aryl radicals, including those in aralkyl radicals, are preferably phenyl or naphthyl radicals, in particular phenyl radicals. They may be substituted by from 1 to 3 of the following radicals: $C_1$- to $C_6$-alkyl, $C_1$- to $C_6$-alkoxy, fluoro, chloro, bromo, cyano, hydroxy, $C_1$- to $C_6$-alkoxycarbonyl or nitro. It is also possible for two adjacent radicals to form a ring.

Aromatic or quasi-aromatic five- or six-membered heterocyclic rings, each of which may optionally be benzanellated, refer, in particular, to imidazole, benzimidazole, oxazole, benzoxazole, thiazole, benzothiazole, indole, pyrazole, triazole, thiophene, isothiazole, benzisothiazole, 1,3,4- or 1,2,4-thiadiazole, pyridine, quinoline, pyrimidine and pyrazine. They may be substituted by from 1 to 3 of the following radicals: $C_1$- to $C_6$-alkyl, $C_1$- to $C_6$-alkoxy, fluoro, chloro, bromo, cyano, nitro, hydroxy, mono- or di-($C_1$- to $C_6$-alkyl)amino, $C_1$- to $C_6$-alkoxycarbonyl, $C_1$- to $C_6$-alkylsulfonyl, $C_1$- to $C_6$-alkanoylamino, phenyl or naphthyl. It is also possible for two adjacent radicals to form a ring.

The electrochromic system according to the invention preferably comprises at least one solvent, an electrochromic fluid being produced as a result which is likewise a subject matter of the present invention.

Suitable solvents include all solvents which are redox-inert at the voltages selected and which cannot dissociate to form electrophiles or nucleophiles or themselves react as sufficiently strong electrophiles or nucleophiles and thus could react with the colored ionic free radicals. Examples are propylene carbonate, γ-butyrolactone, acetonitrile, propionitrile, glutaronitrile, methylglutaronitrile, 3,3'-oxydipropionitrile, hydroxypropionitrile, dimethylformamide, N-methylpyrrolidone, sulfolane, 3-methylsulfolane or mixtures thereof. Preferred are propylene carbonate and mixtures thereof with glutaronitrile.

The electrochromic fluid according to the invention generally contains at least one inert conducting salt.

Suitable inert conducting salts include lithium salts, sodium salts and tetraalkylammonium salts, in particular the latter. The alkyl groups may have from 1 to 18 C atoms and may be identical or different. Preference is given to tetrabutylammonium. Anions suitable for these salts but also as anions $X^-$ in the formulae (I), (II), (IV), (VI), (VII) include all redox-inert, colorless anions. Examples are tetrafluoroborate, perchlorate, methanesulfonate, trifluoromethanesulfonate, perfluorobutanesulfonate, benzenesulfonate, hexafluorophosphate, hexafluoroarsenate and hexafluorosilicate. In the latter case, $X^-$ represents 1/2 $SiF_6^{2-}$.

The conducting salts are preferably employed in the range of from 0.05 to 0.5 molar.

Further additives to the electrochromic fluid may include thickeners, to control the viscosity of the fluid. This may be significant in avoiding segregation, i.e. the formation of stripy or patchy coloration upon prolonged operation of an energized electrochromic device containing the electrochromic fluid according to the invention, and for controlling the bleaching rate once the current has been switched off.

The electrochromic fluid may also be thickened like a gel.

Suitable thickeners include all compounds customary for these purposes, such as e.g. polyacrylate, polymethacrylate (Luctite L®), polycarbonate or polyurethane.

Suitable further additives for the electrochromic fluid include UV absorbers to improve the lightfastness. Examples are UVINUL® 3000 (2,4-dihydroxybenzophenone, BASF), SANDUVOR® 3035 (2-hydroxy-4-n-octyloxybenzophenone, Clariant), TINU-VPN® 571 (2-(2H-benzotriazol-2-yl)-6-dodecyl-4-methylphenol, Ciba), CYASORB 24™ (2,2'-dihydroxy-4- methoxybenzophenone, American Cyanamid Company), UVINUL® 3035 (ethyl 2-cyano-3,3-diphenylacrylate, BASF), UVINUL® 3039 (2-ethylhexyl 2-cyano-3,3-diphenylacrylate, BASF), UVINUL® 3088 (2-ethylhexyl p-methoxycinnamate, BASF).

The UV absorbers are employed in the range of from 0.01 to 2 mol/l, preferably from 0.04 to 1 mol/l. They may also be mixed.

The novel electrochromic fluid comprises a mixture of
a) at least one couple $RED_1'/OX_2'$ corresponding, preferably, to formula (I), in particular formula (Ia), (Ib), (Ic), and/or (Id) and
b) at least one substance $RED_1''$ or $OX_2''$ corresponding, preferably, to formula (CI), (CII), (CIII) and/or (CIV), in particular formula (CI),
in a total concentration of at least $10^{-4}$ mol/l, preferably from $10^{-2}$ to 1 mol/l.

The ratio of the substances from a) and b) is from 95:1 to 1:99, preferably from 95:5 to 40:60.

The electrochromic fluids according to the invention are eminently suitable as a component of an electrochromic device. The present invention therefore further relates to electrochromic devices containing an electrochromic fluid according to the invention. The design of an electrochromic device which may be configured, e.g., as a window pane, automobile canopy, automobile rearview mirror or display, is known in principle. The electrochromic device according to the invention comprises two transparent glass or plastic panes which face one another, one of which is optionally mirrored and whose sides which face one another are coated electroconductively, e.g. with indium tin oxide (ITO), between which the electrochromic fluid according to the invention is located. If one of the panes is mirrored, it may likewise be utilized as a conductive layer. The spacing of the two panes is generally 0.05–1 mm, preferably 0.1–0.5 mm. The desired spacing between the panes is generally established by means of a gasket.

The gasket may be made, for example, from plastic or thin glass or another non-conductive material which is inert with respect to the electrochromic fluid. This may involve, for example, adhesives which cure thermally or photochemically, for example epoxy resins or acrylates. The distance between the panes may be established by means of spacers, for example small plastic or glass spheres, or certain sand fractions.

In addition to the above-described novel electrochromic substances in particular of the formulae (1), in particular the formulae (Ia) to (Id) and (CI) to (CIV), the novel self-erasing single-cell electrochromic device may also contain other substances such as those described, for example, in U.S. Pat. No. 4,902,108, Topics in Current Chemistry, Vol. 92, pp. 1–44 (1980) and Angew. Chem. 90, 927 (1978). Such electrochromic substances are members, for example, of the groups specified above under the formulae (II) to (XX), in which case none of the specified radicals can then have the meaning "direct bond to the bridge B". An admixture of such redox systems may be advantageous, for example, to correct or intensify the hue of e.g. the display, when energized, in the case of the electrochromic device according to the invention.

EXAMPLES

Example 1 a) 5.0 g of 4,4'-dipyridyl were dissolved in 30 ml of anhydrous acetonitrile at 50° C. Over a period of 50 min, 2.7 g of benzyl bromide were added dropwise at this temperature. After 3 h at 50° C. the mixture was cooled and the pale yellow precipitate was filtered off with suction, washed with 60 ml of toluene and dried under reduced pressure. 3.9 g (75% of theory) were obtained of the product of the formula

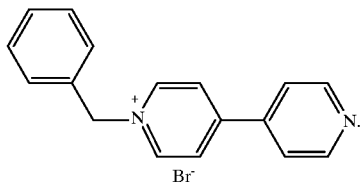

(LXIV)

b) 10.1 g of phenothiazine were dissolved in 60 ml of anhydrous N-methylpyrrolidone under an $N_2$ atmosphere at room temperature. 5.9 g of potassium t-butylate were added. With warming to 30° C. an orange suspension was formed which was stirred for 30 min at 30° C. Then 54 g of 1,4-dibromobutane were added all at once, the temperature rising as far as 53° C. The mixture was heated to 70° C. over a period of 45 min, held at this temperature for 15 min and then cooled. The pale brown suspension was introduced into 1 l of water. The mixture was extracted with 3×200 ml of toluene, the extract was washed with 5×200 ml of water, dried over sodium sulfate and concentrated on a rotary evaporator. The oily residue was dissolved in 400 ml of hexane, insolubly material was filtered off, followed by renewed concentration. Then, at from 0.1 to 0.5 mbar, excess 1,4-dibromobutane was distilled off. This gave 9.6 g (57% of theoretical yield) of a reddish-yellow, viscous oil of the formula

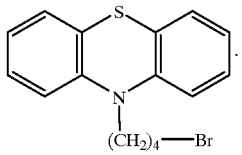

(LXV)

c) 3.7 g of the phenothiazine of the formula (LXV) were dissolved in 10 ml of anhydrous N-methylpyrrolidone at room temperature under $N_2$ atmosphere. 1.8 g of the dipyridinium salt of the formula (LXIV) were added. The suspension was heated to 80° C. over a period of 1 h and kept at this temperature for a total of 13 h, the suspension becoming progressively more viscous. Cooling to room temperature was followed by filtration with suction and washing with 5 ml of N-methylpyrrolidone. The hygroscopic crude product of the formula

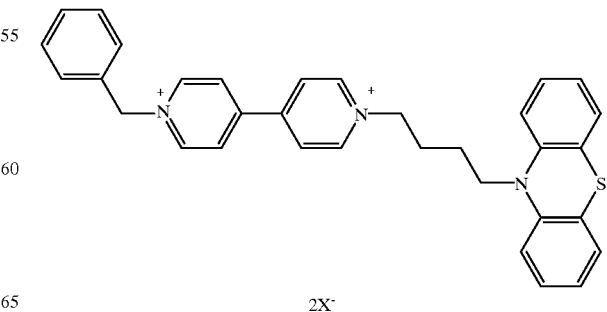

(LXVI)

with X⁻=Br⁻ was dissolved in 7 ml of methanol and filtered. Over a period of 2 h, 3.0 g of tetrabutylammonium tetrafluoroborate were sprinkled into the filtrate. This slowly gave rise to precipitation which was completed in the course of stirring for 18 h at room temperature. Finally this was followed by filtration with suction, washing with methanol until the run off was colorless, and drying under reduced pressure. This gave 0.5 g (13% of the theoretical yield) of pale blueish powder of the formula (LXVI) with X⁻=$BF_4^-$.

Example 2 a) Under a nitrogen atmosphere, 9.2 g of phenazine were suspended in 60 ml of anhydrous tetrahydrofuran. Over a period of 15 min, 30.8 ml of 20 wt % phenyllithium solution in cyclohexane/diethyl ether 7:3 were added dropwise, the temperature being kept at 35° C. or less. The solution was stirred for another 30 min at room temperature.
At 15° C., 30.2 ml of 1,4-dibromobutane were added all at once, the temperature rising to 38° C. in the process. After 6 h at room temperature, 200 ml of water were added and the pH was set to 7.0. The organic phase was separated off, washed three times with 100 ml portions of water and concentrated under reduced pressure. Finally excess 1,4-dibromobutane was distilled off at a pressure of 0.2 mbar. The oily residue was dissolved with heating in 400 ml of ethanol. The product precipitated after cooling was filtered off with suction, washed with ethanol and hexane and dried. This gave 8.0 g (41% of the theoretical yield) of pale yellow powder of the 9,10-dihydrophenazine of the formula

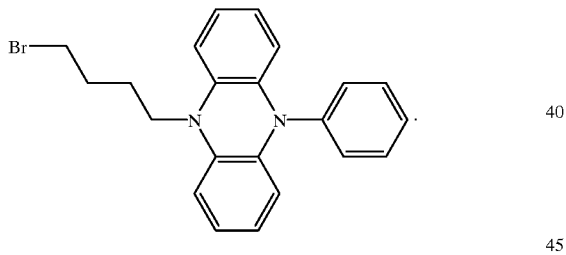

(LXVII)

b) 7.5 g of the 9,10-dihydrophenazine of the formula (LXVII) from a) and 6.1 g of 4,4'-dipyridyl were stirred in 100 ml of acetonitrile for 24 h at 70° C. under a nitrogen atmosphere. After cooling the mixture was filtered with suction, followed by washing with 50 ml of acetone. Drying resulted in 6.3 g (60% of the theoretical yield) of the salt of the formula

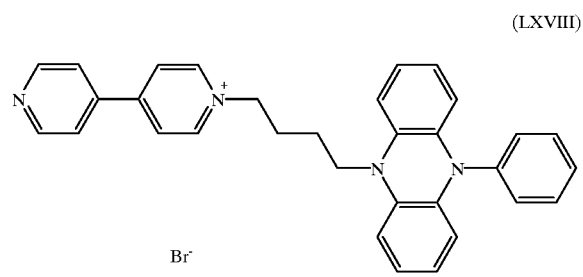

(LXVIII)

c) 6.1 g of the salt obtained under b) were stirred, in 70 ml of N-methyl-2-pyrrolidone, together with 2.7 ml of benzylbromide, for 7 h at 70° C. under a nitrogen atmosphere. After cooling this was diluted with 150 ml of toluene and the precipitated product was filtered off with suction. It was thoroughly washed with 150 ml of toluene and 500 ml of hexane and dried. This gave 5.5 g (69% of the theoretical yield) of the dipyridinium salt of the formula

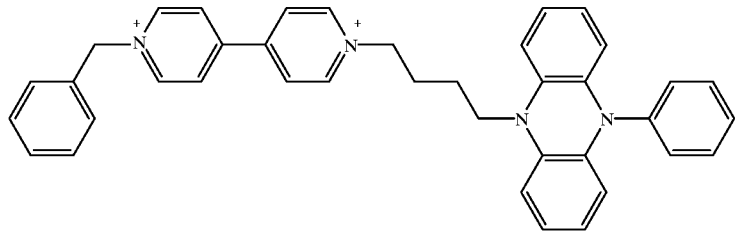

(LXIX)

with X⁻ = Br⁻.

d) 4.0 g of this product from c) were dissolved in 100 ml of methanol at 65° C. under nitrogen atmosphere. Over a period of 5 min, 7.4 g of tetrabutylammonium tetrafluoroborate were sprinkled in. Precipitation occurred. After 5 min at 65° C. the mixture was cooled and filtered with suction, followed by washing with 200 ml of methanol and 50 ml of hexane and drying under reduced pressure. This gave 3.4 g (83% of the theoretical yield) of pale beige powder of the formula (LXIX) with $X^-=BF_4^-$.

Example 3 a) 45.3 g of 2-methylthiobenzothiazole were dissolved in 75 ml of toluene. 151 ml of 1,4-dibromobutane and a spatula tip of potassium iodide were added, followed by boiling for 4 h and cooling. Filtration was followed by washing with 50 ml of toluene. The filtrate was heated to 50° C. and 35.9 ml of dimethyl sulfate were added. Stirring for 8 h at 50° C. was followed by cooling, filtering with suction and washing with 250 ml of toluene. The product was stirred up in 100 ml of acetone, again filtered off with suction and washed with 300 ml of acetone. After drying under reduced pressure this gave 53.1 g (50% of the theoretical yield) of the salt of the formula (LXX)

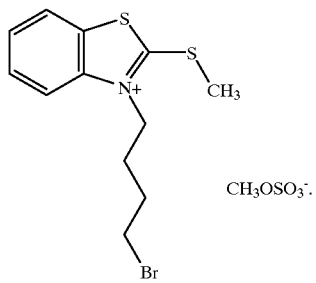

b) Under a nitrogen atmosphere, 6.95 g of the benzothiazolium salt of the formula (LXX) from a) and 2.9 g of the hydrazone of the formula (LXXI)

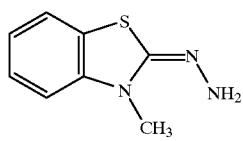

(from Aldrich Chemical Company Ltd., England) were suspended in 60 ml of acetonitrile. 2.3 ml of triethylamine were added at room temperature. This briefly produced a solution, after which a precipitate formed. After 5 h at room temperature the mixture was filtered off with suction, followed by washing with 50 ml of methanol, 100 ml of water and a further 50 ml of methanol until the runoff was colorless, and drying under reduced pressure. This gave 6.0 g (83% of the theoretical yield) of the azine of the formula (LXXII)

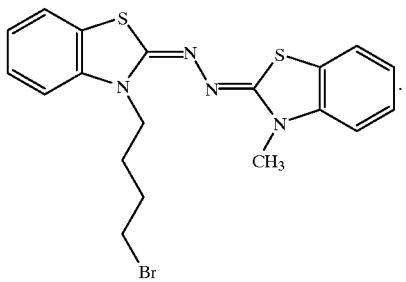

c) If a procedure similar to Example 1a) was followed, except that 6.8 ml of butyl bromide were used instead of benzyl bromide, this gave 5.2 g (57% of the theoretical yield) of the pyridinium salt of the formula (LXXIII)

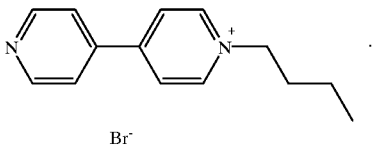

d) 2.0 g of the azine of the formula (LXXII) from b) and 1.3 g of the pyridinium salt of the formula (LXXIII) from c) were stirred in 20 ml of N-methyl-2-pyrrolidone under a nitrogen atmosphere for 102 h at. 80° C.

After cooling, a greenish crystalline product was filtered off with suction and washed with 50 ml of acetone. After drying this gave 0.25 g (7.6% of the theoretical yield) of the dipyridinium salt of the formula (LXXIV)

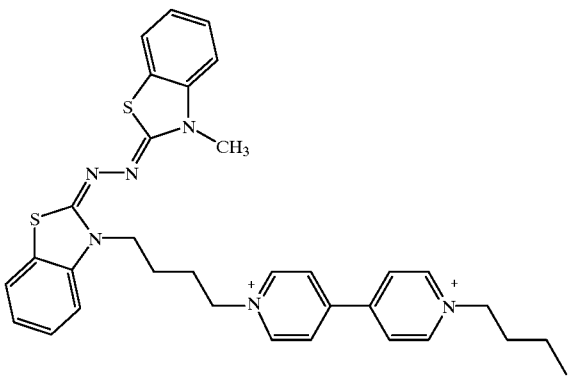

with $X^- = Br^-$.

e) 0.25 g of the product from c) was dissolved almost completely in 5 ml of methanol, and 0.45 g of tetrabutylammonium tetrafluoroborate was added.

The mixture was stirred for 17 h at room temperature, the product gradually becoming crystalline. It was filtered off with suction, washed with 25 ml of methanol, 25 ml of water and again with 25 ml of methanol. After drying this gave 0.15 g (59% of the theoretical yield) of pale gray powder of the formula (LXXIV) with $X^-=BF_4^-$.

Example 4 a) 4.0 g of the phenothiazine of the formula (LXV) from Example 1b) and 0.95 g of 4,4'-dipyridyl were stirred in 10 ml of acetonitrile under a nitrogen atmosphere for 9 h at 70° C. The suspension was then diluted with 10 ml of N-methyl-2-pyrrolidone and stirred for 25 h at 70° C. and 7 h at 80° C. After cooling the mixture was filtered off with suction, followed by washing with 50 ml of methanol and drying under reduced pressure. This gave 1.6 g (32% of the theoretical yield) of the dipyridinium salt of the formula (LXXV)

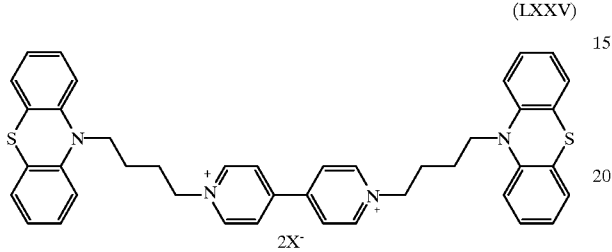

with X⁻ = Br⁻.

b) 1.4 g of the salt of the formula (LXXV) from a) were partially dissolved in 20 ml of methanol under reflux. 2.3 g of tetrabutylammonium tetrafluoroborate were added. The mixture was boiled for a further 5 min and then stirred until it was cold. The precipitated product was filtered off with suction, washed with 50 ml of methanol, 50 ml of water and again with 50 ml of methanol and dried under reduced pressure. This gave 1.1 g (77% of the theoretical yield) of dipyridinium salt of the formula (LXXV) with X⁻=BF₄⁻.

Example 5

A cell like that described in U.S. Pat. No. 4,902,108 was constructed from two glass plates, coated with indium tin oxide (ITO), and a gasket. Via a port in the gasket it was filled, under a nitrogen atmosphere, with a solution which was 0.04 molar with respect to the electrochromic substance of the formula (LXXIV) with $X^{\ominus}=BF_4^{\ominus}$ according to Example 3, 0.01 molar with respect to the tetrazolium salt of the formula (CXXVI)

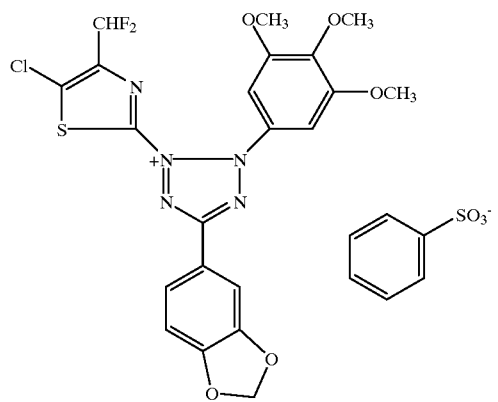

and 0.5 molar with respect to tetrabutylammonium tetrafluoroborate in anhydrous propylene carbonate. The cell was sealed so as to be airtight. The solution in the cell was pale yellow. After a voltage of 1.5 V was applied, the solution rapidly turned intensely purple-brown, the cell contents completely bleaching once more within 1 min after the voltage was switched off. Short-circuiting of the cell resulted in more rapid bleaching.

After 9,000 coloring/bleaching cycles the cell still worked satisfactorily.

Example 6

A cell was constructed as in Example 5, except that one of the glass plates was mirrored on the side facing away from the ITO layer.

Under an N₂ atmosphere it was filled with a solution which was 0.04 molar with respect to the electrochromic subtance of the formula (LXIX) with $X^{\ominus}=BF_4^{\ominus}$ according to Example 2 and 0.01 molar with respect to the tetrazolium salt of the formula (CXXIV)

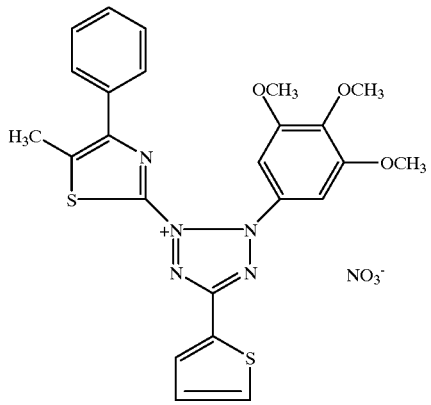

in anhydrous propylene carbonate. The color of the solution in the cell was pale yellow. After a voltage of 0.9 V was applied, the solution rapidly turned deep black-brown; after the power supply was switched off, combined with short-circuiting, the cell contents bleached once more in about 10 s, resulting in the original pale yellow. More than 5,000 such operating cycles were survived without any changes.

In a manner entirely similar to Examples 5 and 6, electrochromic cells were constructed, use being made of the following electrochromic substances listed in the table, giving similarly good results.

| Ex. | OX'$_2$-B-RED'$_1$ | OX$_2$" | Color |
|---|---|---|---|
| 7 | 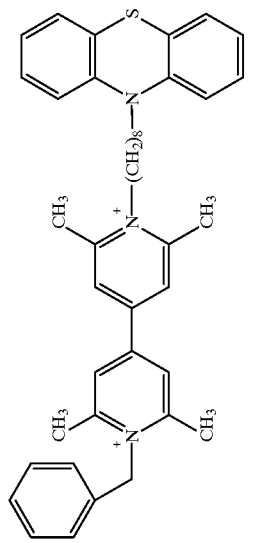 2 BF$_4^\ominus$ | 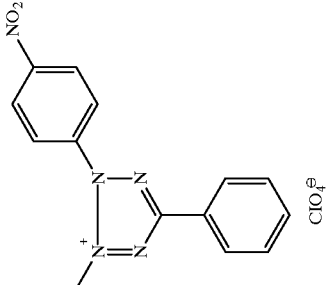 ClO$_4^\ominus$ | red |
| 8 | 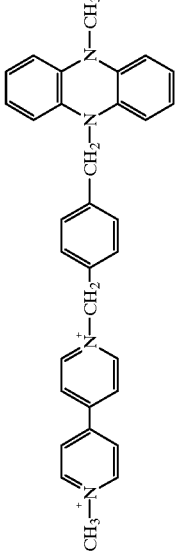 2 BF$_4^\ominus$ | 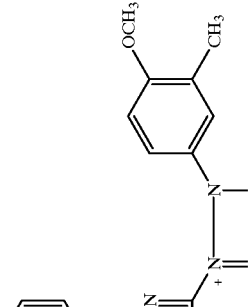 BF$_4^\ominus$ | black |

| Ex. | OX'$_2$-B-RED'$_1$ | OX$_2$" | Color |
|---|---|---|---|
| 9 | (structure with 2 ClO$_4^\ominus$) | (structure with BF$_4^\ominus$) | brown |
| 10 | (structure with 2 BF$_4^\ominus$) | (structure with BF$_4$) | black |

| Ex. | OX'₂-B-RED'₁ | OX₂" | Color |
|---|---|---|---|
| 11 | 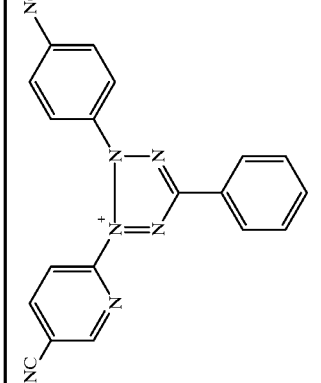 2 BF₄⁻ | 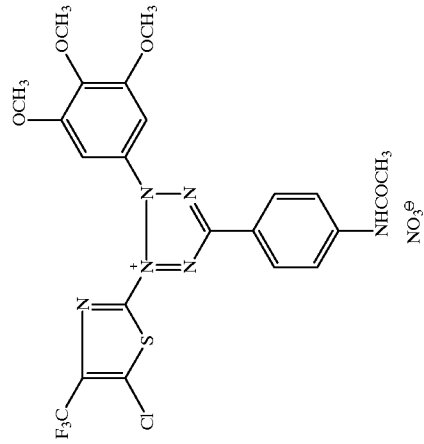 PF₆⁻ | violet |
| 12 | 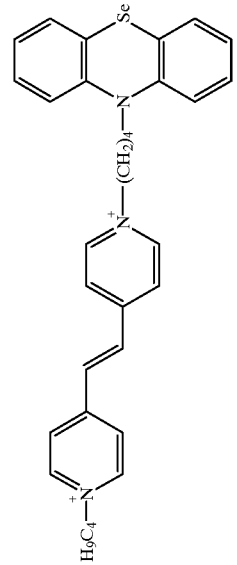 2 BF₄⁻ |  NO₃⁻ | brown-black |

-continued
| Ex. | OX'$_2$-B-RED'$_1$ | OX$_2$" | Color |
|---|---|---|---|
| 13 | 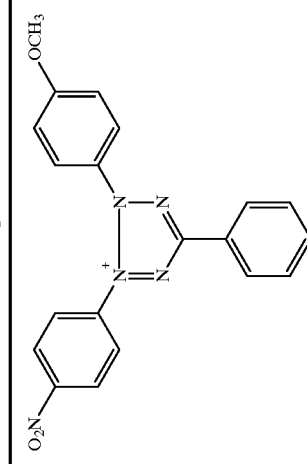 | 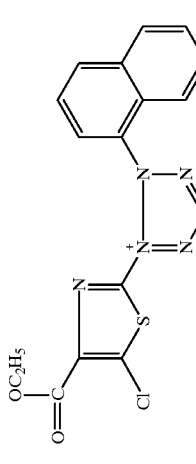 | purple |
| 14 | 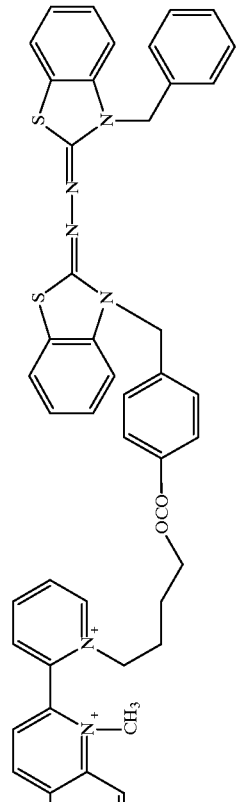 | 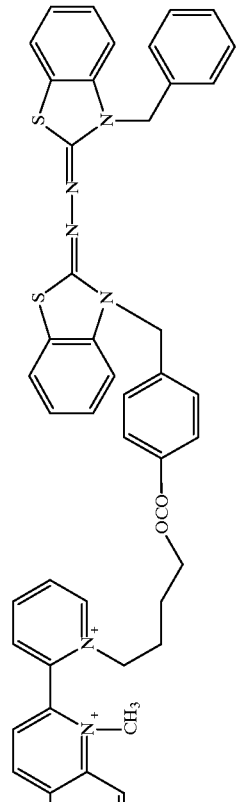 | black |

-continued

| Ex. | OX'₂-B-RED'₁ | OX''₂ | Color |
|---|---|---|---|
| 15 | [structure with indole groups, CH₃, (CH₂)₄, bipyridinium, CH₃-N⁺]  2 BF₄⁻ | [triazole structure with COOH, NO₂, Cl, CH₃O, isopropyl, thiazole substituents]  CH₃SO₃⁻ | red |
| 16 | [bis-phenothiazine structure linked via (CH₂)₄ to bipyridinium (CH₂)₄]  2 BF₄⁻ | [triazole structure with OC₂H₅, CH₃, CH₃, benzothiazole, CH₃O substituents]  BF₄⁻ | red |

What is claimed is:

1. An electrochromic system comprising oxidizable substances $RED_1$ which, by releasing electrons at an anode, are converted from a weakly colored or colorless form into a colored form $OX_1$, and reducible substances $OX_2$ which, by accepting electrons at a cathode, are converted from a weakly colored or colorless form into a colored form $RED_2$, the absorbance in the visible region of the spectrum increasing in each of these cases, and the weakly colored or colorless form being recovered in each case after charge equalization, wherein the substances $RED_1$ and $OX_2$ are a mixture comprising at least one couple $RED_1'/OX_2'$ which is linked covalently to one another via a bridge and at least one substance $RED_1''$ or $OX_2''$ in which the reciprocal conversion of oxidized and reducible form takes place by a σ bond being broken or formed.

2. The electrochromic system as claimed in claim 1, which comprises at least one couple $RED_1'/OX_2'$ corresponding to the formula (I)

 (I), in which

Y and Z independently of one another represent a radical $OX_2'$ or $RED_1'$, but where at least one Y represents $OX_2'$ and at least one Z represents $RED_1'$, where $OX_2'$ represents the radical of a reversibly electrochemically reducible redox system, and $RED_1'$ represents the radical of a reversibly, electrochemically oxidizable redox system, B represents a bridge member, c represents an integer from 0 to 5, and a and b independently of one another represent an integer from 0 to 5, and at least one reducible substance $OX_2''$ which represents a cyclic organic compound which, after accepting 1 or 2 electrons, is converted, one of the σ bonds of the ring being broken, into an open-ring compound and which, by releasing 1 or 2 electrons, is converted once more into the cyclic starting compound, in each case precisely two electrons being transferred overall.

3. The electrochromic system as claimed in claim 1, wherein the couple $RED_1'/OX_2'$ is at least one electrochromic substance of the formulae OX2'-B-RED1' (Ia), OX2'-B-RED1'-B-OX2' (Ib), RED1'-B-OX2'-B-RED1' (Ic), or OX2'-(B-RED1'-B-OX2')d-B-RED1' (Id), in which $OX_2'$, $RED_1'$ amd B have the abovementioned meanings, and d represents an integer from 1 to 5.

4. The electrochromic system as claimed in claim 1, wherein the couple $RED_1'/OX_2'$ is a substance of the formulae (Ia) to (Id), in which $OX_2'$ represents the radical of a cathodically reducible substance which in a cyclic voltammogram, recorded in an inert solvent at room temperature, exhibits at least two chemically reversible reduction waves, the first of these reduction waves leading to an increase in the absorbance at at least one wavelength in the visible range of the electromagnetic spectrum, $RED_1'$ represents the radical of the anodically reversibly oxidizable substance which in a cyclic voltammogram, recorded in an inert solvent at room temperature, exhibits at least two chemically reversible oxidation waves, the first of these oxidation waves leading to an increase in the absorbance at at least one wavelength in the visible range of the electromagnetic spectrum, and B represents a bridge member.

5. The electrochromic system as claimed in claim 1, wherein the substance $OX_2''$ is a compound selected from the group consisting of the tetrazolium salts, benzo- or naphthotriazolium salts, cyclopropanes and [1.1.0] bicyclobutanes.

6. The electrochromic system as claimed in claim 1, wherein the substance $OX_2''$ is a tetrazolium salt, naphthotriazolium salt, cyclopropane and/or [1.1.0]bicyclobutane of the formulae

 (CI)

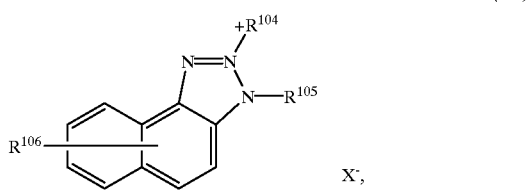 (CII)

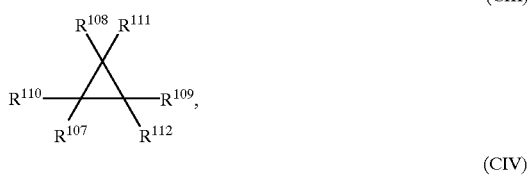 (CIII)

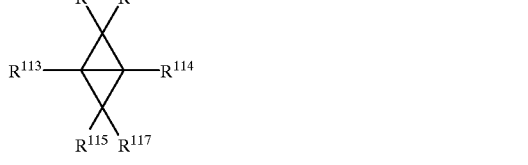 (CIV)

in which $R^{101}$ to $R^{105}$, independently of one another, represent $C_6$- to $C_{10}$-aryl or an aromatic or quasi-aromatic five- or six-membered heterocyclic ring, each of which is optionally benzanellated, $R^{107}$, $R^{109}$, $R^{113}$ and $R^{114}$, independently of one another, represent a radical of the formulae (CV) to (CVII)

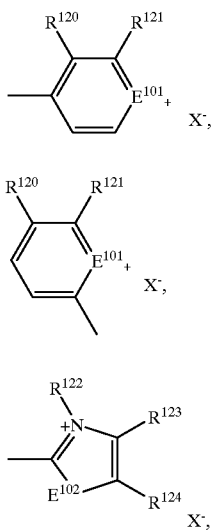

(CV)

(CVI)

(CVII)

$R^{108}$, $R^{115}$ and $R^{116}$, independently of one another, represent $C_6$- to $C_{10}$-aryl, or a radical of the formulae (CV) to (CVII), $R^{110}$ to $R^{112}$, $R^{117}$ and $R^{118}$, independently of one another, represent hydrogen, $C_1$- to $C_4$-alkyl, halogeno or cyano, $E^{101}$ and $E^{102}$, independently of one another, represent O, S or N—$R^{119}$, $R^{119}$ $R^{122}$, independently of one another, represent $C_1$- to $C_{18}$-alkyl, $C_2$- to $C_8$-alkenyl, or $C_4$- to $C_7$-cycloalkyl, $C_7$- to $C_{15}$-aralkyl or $C_6$- to $C_{10}$-aryl, $R^{106}$, $R^{120}$, $R^{121}$, $R^{123}$ and $R^{124}$, independently of one another, represent hydrogen, $C_1$- to $C_4$-alkyl, $C_1$- to $C_4$-alkoxy, halogeno, cyano, nitro or $C_1$- to $C_4$-alkoxycarbonyl, or $R^{120}$ and $R^{121}$, or $R^{123}$ and $R^{124}$, jointly form a —CH=CH—CH=CH— bridge, and $X^-$ represents a colorless anion which is redox-inert under the conditions.

7. The electrochromic system as claimed in claim 1, which comprises as the couple $RED_1'/OX_2'$ at least one substance of the formula (Ia)–(Id), in which $OX_2'$ represents a radical of the formulae (II), (III), (IV) or (V),

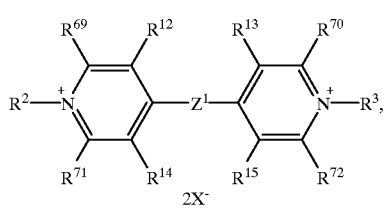
(II)

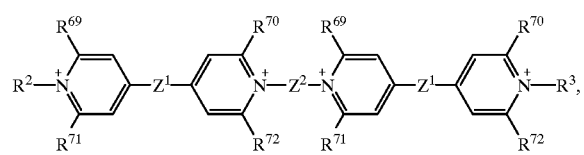
(III)

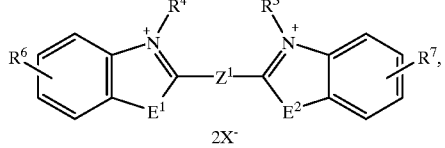
(IV)

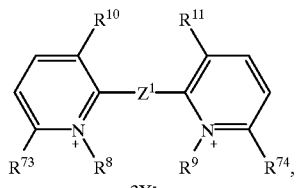
(V)

in which $R^2$, $R^3$, $R^4$, $R^5$, $R^8$ and $R^9$, independently of one another, represent $C_1$- to $C_{12}$-alkyl, $C_2$- to $C_8$-alkenyl, $C_5$- to $C_7$-cycloalkyl, $C_7$- to $C_{15}$-aralkyl or $C_6$- to $C_{10}$-aryl, $R^6$ and $R^7$, independently of one another, represent hydrogen, methyl, ethyl, methoxy, ethoxy, fluoro, chloro, bromo, cyano, nitro, methoxycarbonyl or ethoxycarbonyl, $R^{10}$, $R^{11}$; $R^{12}$, $R^{13}$ and $R^{14}$, $R^{15}$, independently of one another, represent hydrogen or, if $Z^1$ represents a direct bond, in each case jointly represent a —(CH$_2$)$_2$—, —(CH$_2$)$_3$— or —CH=CH— bridge, or $R^4$, $R^5$ and $R^8$, $R^9$, independently of one another, pairwise jointly represent a —(CH$_2$)$_2$— or —(CH$_2$)$_3$— bridge, if $Z^1$ represents a direct bond, $R^{69}$ to $R^{74}$, independently of one another, represent hydrogen or $C_1$- to $C_4$-alkyl, $E^1$ and $E^2$ are identical and represent O, S, NR$^1$ or C(CH$_3$)$_2$ or jointly form an —N—(CH$_2$)$_2$—N— bridge, $R^1$ represents $C_1$- to $C_{12}$-alkyl, $C_2$- to $C_4$-alkenyl, $C_5$- to $C_7$-cycloalkyl, $C_7$- to $C_{15}$-aralkyl or $C_6$- to $C_{10}$-aryl, $Z^1$ represents a direct bond, —CH=CH—, —C(CH$_3$)=CH—, —C(CN)=CH—, —C≡C— or —CH=N—N=CH—, $Z^2$ represents —(CH$_2$)$_r$— or —CH$_2$—C$_6$H$_4$—CH$_2$—, r represents an integer between 1 and 6, $X^-$ represents a colorless anion which is redox-inert under the conditions, the bond to the bridge member B being effected via one of the radicals $R^{2-R11}$ or, in the case where $E^1$ or $E^2$ represents NR$^1$, being effected via $R^1$ and the said radicals then representing a direct bond, $RED_1'$ represents a radical of the formulae (X), (XI), (XII), (XIII), (XVI), (XVII), (XVIII) or (XX),

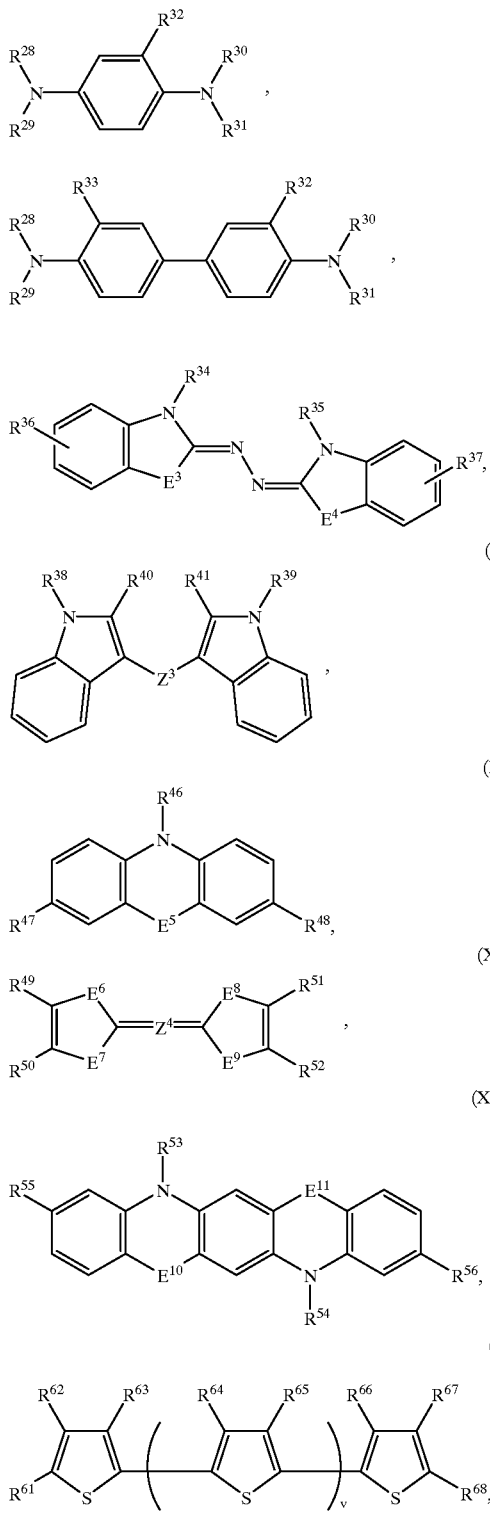

hydrogen, methyl, ethyl, methoxy, ethoxy, fluoro, chloro, bromo, cyano, nitro, methoxycarbonyl, ethoxycarbonyl or phenyl, $Z^3$ represents a direct bond, a —CH=CH— or —N=N— bridge, =$Z^4$= represents a direct double bond, a =CH—CH= or =N—N= bridge, $E^3$ to $E^5$, $E^{10}$ and $E^{11}$, independently of one another, represent O, S, NR$^{59}$ or C(CH$_3$)$_2$, but $E^3$ and $E^4$ have identical meanings, $E^6$ to $E^9$, are identical to each other and represent S, Se or NR$^{59}$ or $E^6$ represents NR$^{59}$, where R$^{59}$ is a direct bond to the bridge B and $E^7$ to $E^9$ have the abovementioned meanings, but need not be identical to one another, $R^{59}$ represents $C_1$- to $C_{12}$-alkyl, $C_2$- to $C_8$-alkenyl, $C_5$- to $C_7$-cycloalkyl,, $C_7$- to $C_{15}$-aralkyl or $C_6$- to $C_{10}$-aryl, $R^{61}$, $R^{62}$ and $R^{67}$, $R^{68}$, independently of one another, represent hydrogen, $C_1$- to $C_4$-alkyl, methoxycarbonyl, ethoxycarbonyl or phenyl or, pairwise jointly, represent a —(CH$_2$)$_3$— or —(C$_2$)$_4$— bridge, $R^{63}$ to $R^{66}$ represent hydrogen and v represents an integer from 1 to 6, the bond to the bridge member B being effected by one of the radicals $R^{28-R41}$, $R^{46}$–$R^{56}$, $R^{61}$, $R^{62}$, $R^{67}$, $R^{68}$ or, in the case where one of the radicals $E^3$–$E^{11}$ represents NR$^{59}$, being effected via R$^{59}$ and the said radicals then representing a direct bond, B represents a bridge member of the formulae
—(CH$_2$)$_n$—, —(CH$_2$)$_m$—O—(CH$_2$)$_p$—, —(CH)$_m$—NR$^{60}$—(CH$_2$)$_p$—, —(CH$_2$)$_m$—C$_6$H$_4$—(CH$_2$)$_p$—, —[O—(CH$_2$)$_p$]$_o$—O—, —[NR$^{60}$—(CH$_2$)$_p$]$_o$—NR$^{60}$—, —[C$_6$H$_4$—(CH$_2$)$_p$]$_o$—C$_6$H$_4$—, —(CH$_2$)$_m$—OCO—C$_6$H$_4$—COO—(CH$_2$)$_p$—, —(CH$_2$)$_m$—NHCO—C$_6$H$_4$—CONH—(CH$_2$)$_p$—, —(CH$_2$)$_m$—NHCONH—C$_6$H$_4$—NHCONH—(CH$_2$)$_p$—, —(CH$_2$)$_m$—OCO—(CH$_2$)$_t$—COO—(CH$_2$)$_p$—, —(CH$_2$)$_m$—NHCO—(CH$_2$)$_t$—CONH—(CH)$_p$—, —(CH$_2$)$_m$—NHCONH—(CH$_2$)$_t$—NHCONH—(CH$_2$)$_p$—, $R^{60}$ represents methyl, ethyl, benzyl or phenyl, n represents an integer from 1 to 10, m and p, independently of one another, represent an integer from 0 to 4, o represents an integer from 0 to 2 and t represents an integer from 1 to 6 and as the substance OX$_2$" comprises at least one tetrazolium salt of the formula (CI), in which $R^{101}$ and $R^{102}$ correspond to a radical of formula (CXIX), $R^{103}$ corresponds to a radical of formula (CXX), $R^{157}$, $^{159}$ and $R^{160}$, independently of one another, represent hydrogen, methyl, ethyl, methoxy, ethoxy, cyano, nitro, —N$^+$(CH$_3$)$_3$ or COOH, or $R^{157}$ and $R^{159}$ jointly form an —O—CH$_2$—O— bridge, $R^{158}$ represents hydrogen, methyl, methoxy or chloro, $R^{161}$ represents methyl, difluoromethyl, trifluoromethyl, methoxycarbonyl, ethoxycarbonyl or phenyl, $R^{162}$ represents hydrogen, methyl, ethyl, phenyl or chloro, or $R^{161}$ and $R^{162}$ jointly form a —CH=CH—CH=CH— or —CH=CH—C(OCH$_3$)=CH— bridge, $E^{112}$ represents S, in which $R^{28}$, $R^{29}$ to $R^{31}$, $R^{34}$, $R^{35}$, $R^{38}$, $R^{39}$, $R^{46}$, $R^{53}$ and $R^{54}$, independently of one another, represent $C_1$- to $C_{12}$-alkyl, $C_2$- to $C_8$-alkenyl, $C_5$- to $C_7$-cycloalkyl, $C_7$- to $C_{15}$-aralkyl or $C_6$- to $C_{10}$-aryl, $R^{32}$, $R^{33}$, $R^{36}$, $R^{37}$, $R^{40}$, $R^{41}$, $R^{47}$, $R^{48}$, $R^{49}$, $R^{50}$ to $R^{52}$ $R^{55}$ and $R^{56}$, independently of one another, represent X⁻ represents a colorless anion which is redox-inert under the conditions.

8. The electrochromic system as claimed in claim 1, which comprises as the couple $RED_1'/OX_2'$, at least one substance of the formula (Ia)–(Id) in which $OX_2'$ represents a radical of the formulae (II), (IV) or (V) as claimed in claim 7, in which $R^2$, $R^4$ and $R^8$ represent a direct bond to the bridge member B, $R^3$, $R^5$ and $R^9$, independently of one another, represent methyl, ethyl, propyl, butyl, pentyl, hexyl, heptyl, octyl, benzyl or phenyl or, in the case of the formulae Ic or Id likewise represent a direct bond to the bridge member B, $R^6$ and $R^7$ are identical and represent hydrogen, methyl, methoxy, chloro, cyano or methoxycarbonyl, $R^{10}$, $R^{11}$; $R^{12}$, $R^{13}$ and $R^{14}$, $R^{15}$, independently of one another, represent hydrogen or, if $Z^1$ represents a direct bond, in each case pairwise jointly represent a —CH=CH— bridge, $R^{69}$ to $R^{72}$ are identical and represent hydrogen, methyl or ethyl, $R^{73}$ and $R^{74}$ represent hydrogen, $E^1$ and $E^2$ are identical and represent O or S, $Z^1$ represents a direct bond or —CH=CH—, $X^1$ represents a colorless anion which is redox-inert under the conditions, $RED_1'$ represents a radical of the formulae (X), (XII), (XIII), (XVI) or (XVII) as claimed in claim 7, in which $R^{28}$, $R^{34}$, $R^{38}$, $R^{46}$ and $R^{49}$ represent a direct bond to the bridge member B, $R^{29}$ to $R^{31}$, $R^{35}$ and $R^{39}$, independently of one another, represent methyl, ethyl, propyl, butyl, pentyl, hexyl, heptyl, octyl, benzyl or phenyl or, in the case of the formulae Ib or Id, $R^{30}$, $R^{35}$ and $R^{39}$ likewise represent the direct bond to the bridge member B, $R^{32}$, $R^{47}$ and $R^{48}$ represent hydrogen, $R^{36}$, $R^{37}$, $R^{40}$, $R^{41}$ and $R^{50}$ to $R^{52}$, independently of one another, represent hydrogen, methyl, methoxy, chloro, cyano, methoxycarbonyl or phenyl or, in the case of the formula Ib or Id, $R^{51}$ likewise represents a direct bond to the bridge member B, $Z^3$ represents a direct bond, a —CH=CH— or —N=N— bridge, =$Z^4$= represents a direct double bond, a =CH—CH= or =N—N= bridge, $E^3$ to $E^5$ independently of one another, represent O, S or $NR^{59}$, but $E^3$ and $E^4$ have identical meanings, $E^6$ to $E^9$ are identical to one another and represent S, Se or $NR^{59}$, $R^{59}$ represents methyl, ethyl, propyl, butyl, pentyl, hexyl, heptyl, octyl, benzyl or phenyl or, in the case of the formula XVI in Ib or Id likewise represents a direct bond to the bridge member B, B represents a bridge member of the formulae
—$(CH_2)_n$—; —$(CH_2)_m$—O—$(CH_2)_p$—, —$(CH_2)_m$—$NR^{60}$—$(CH_2)_p$—, —$(CH_2)_m$—$C_6H_4$—$(CH_2)_p$—, —O—$(CH_2)_p$—O—, —$NR^{60}$—$(CH_2)_p$o-$NR^{60}$—, —$(CH_2)_m$—OCO—$C_6H_4$—COO—$(CH_2)_p$—, —$(CH_2)_m$—NHCO—$C_6H_4$—CONH—$(CH_2)_p$—, —$(CH_2)_m$—NHCONH—$C_6H_4$—NHCONH—$(CH_2)_p$—, —$(CH_2)_m$—OCO—$(CH)_t$—COO—$(CH_2)_p$—, —$(CH_2)_m$—NHCO—$(CH_2)_t$—CONH—$(CH_2)_p$—, —$(CH_2)_m$—NHCONH—$(CH_2)_t$—NHCONH—$(CH_2)_p$—, $R^{60}$ represents methyl, n represents an integer from 1 to 10, m and p are identical and represent an integer from 0 to 2 and t represents an integer from 1 to 6 and, as the substance $OX_2''$ comprises at least one substance of the formula (CI),

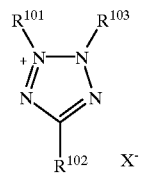

(CI)

in which $R^{101}$, $R^{102}$, $R^{103}$ and X⁻ have the meanings specified in claim 6.

9. Electrochromic system as claimed in claim 1, which comprises, as the couple $RED_1'/X_2'$, at least one substance of the formula (Ia) corresponding to one of the formulae (XXI)

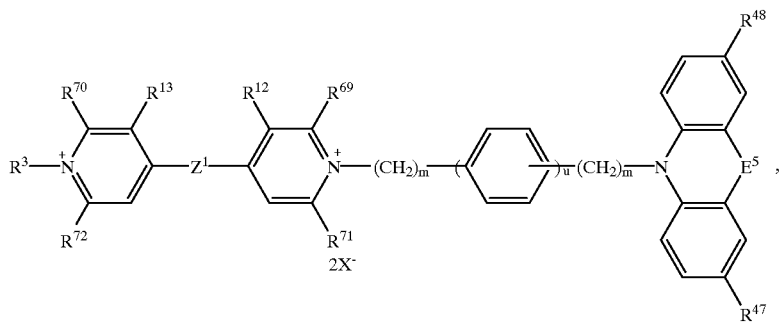

-continued
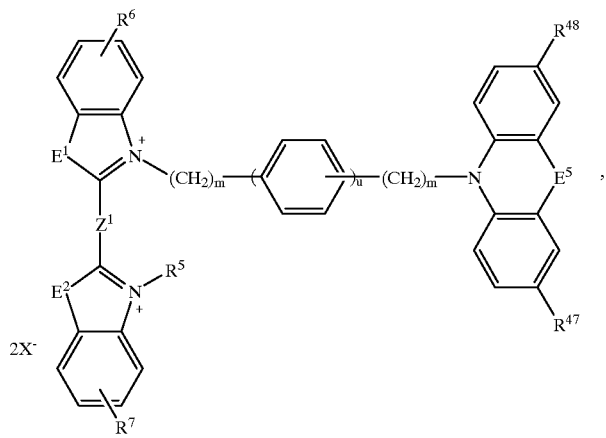
(XXII)
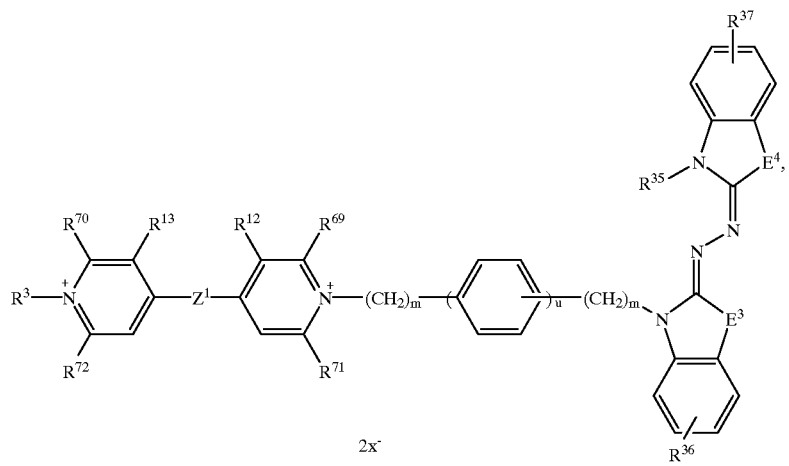
(XXIII)
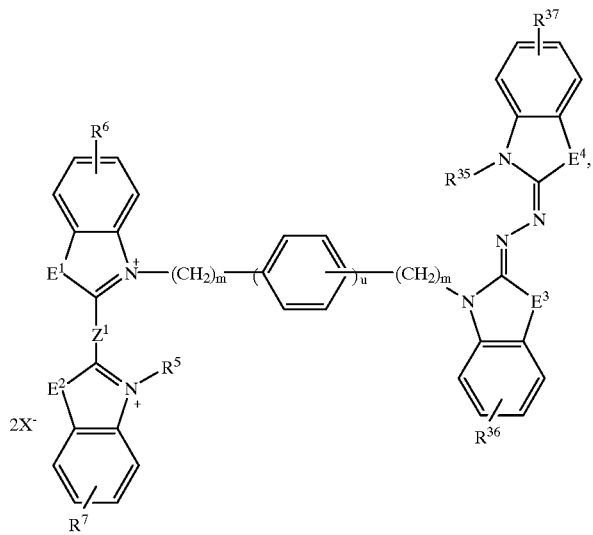
(XXIV)

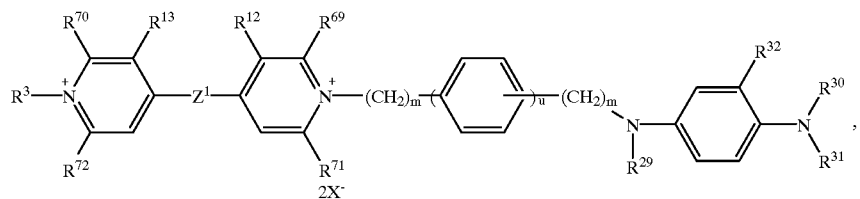
(XXV)
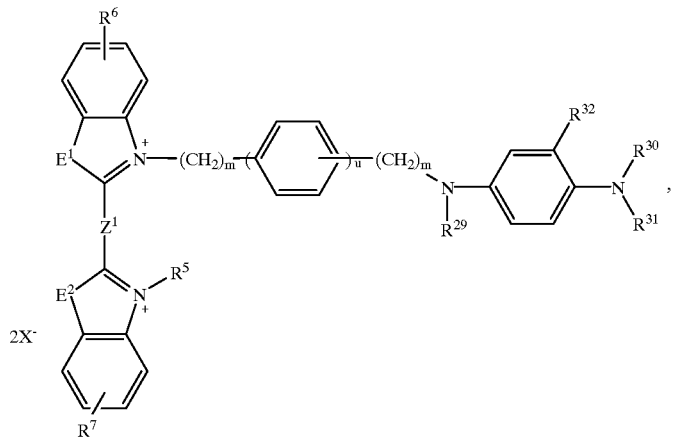
(XXVI)
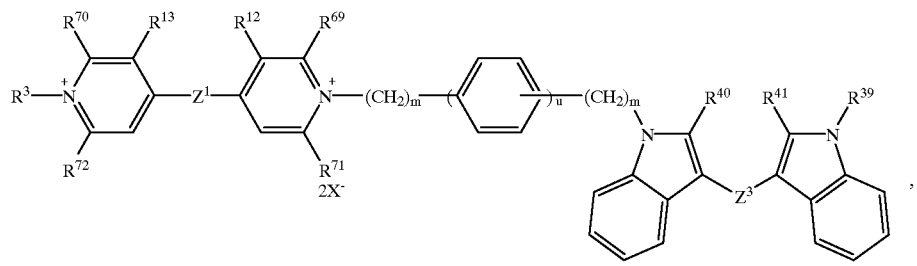
(XXVII)
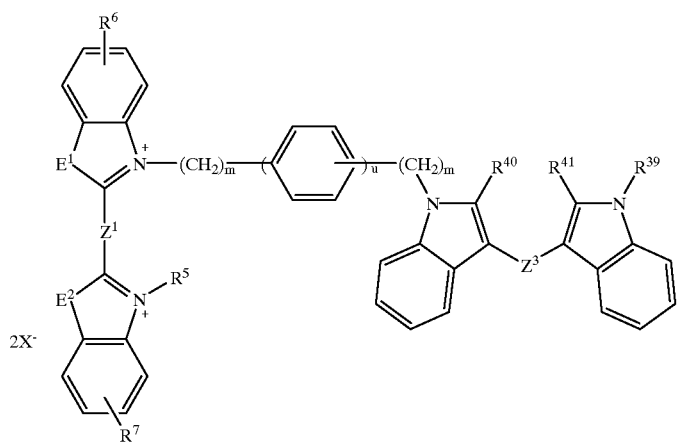
(XXVIII)
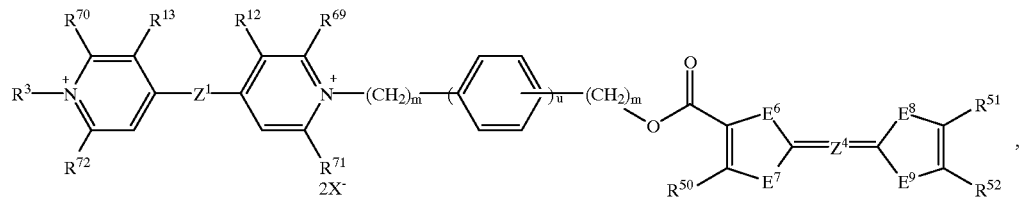
(XXIX)

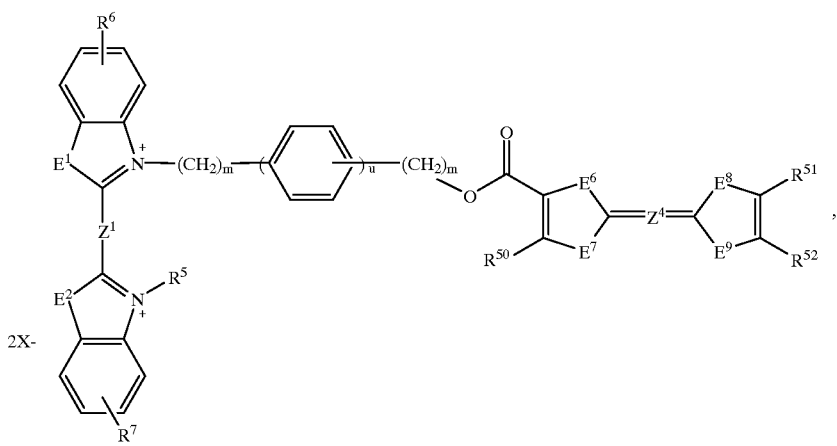
or at least one substance of the formula (Ib) corresponding to one of the formulae
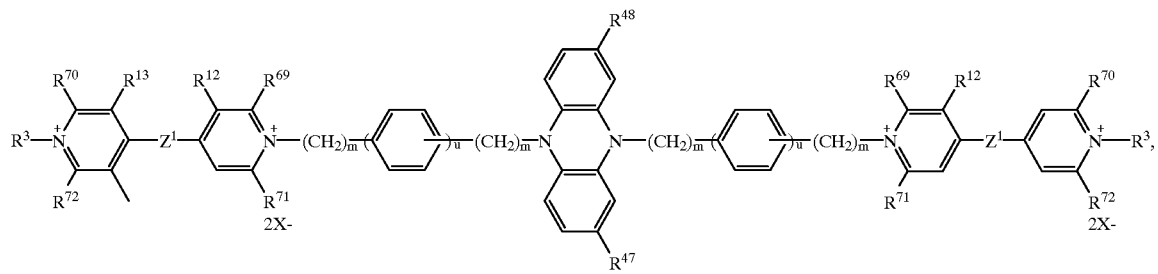
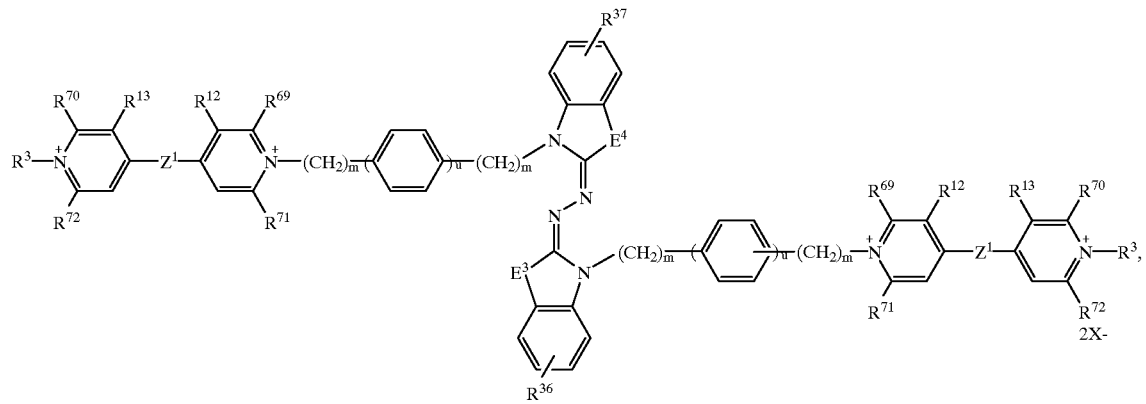

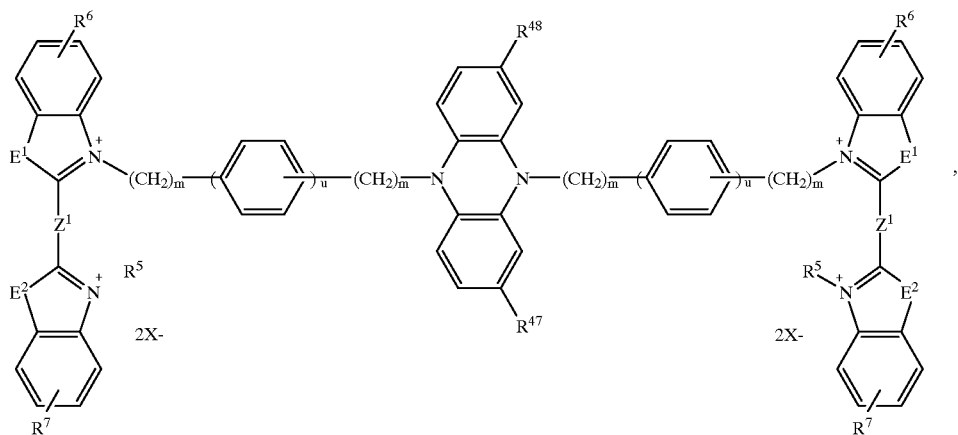
(XXXIII)
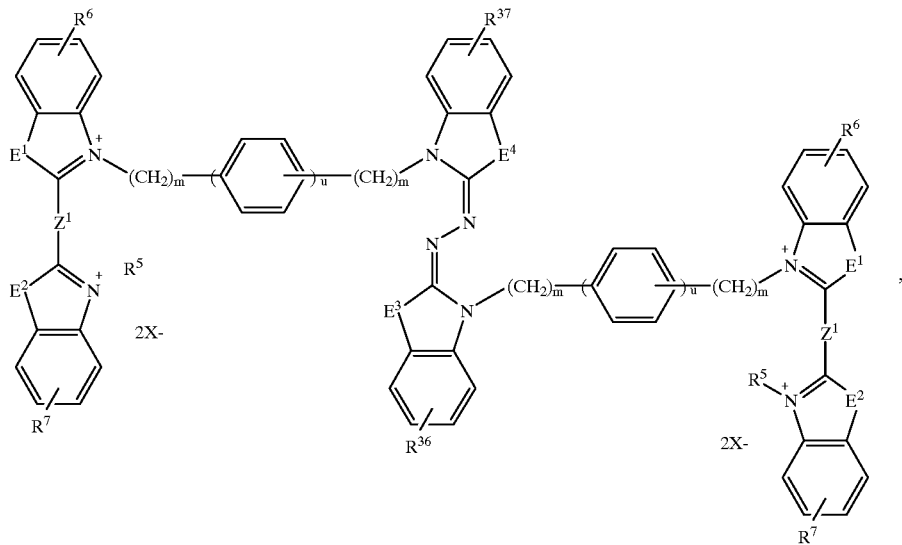
(XXXIV)
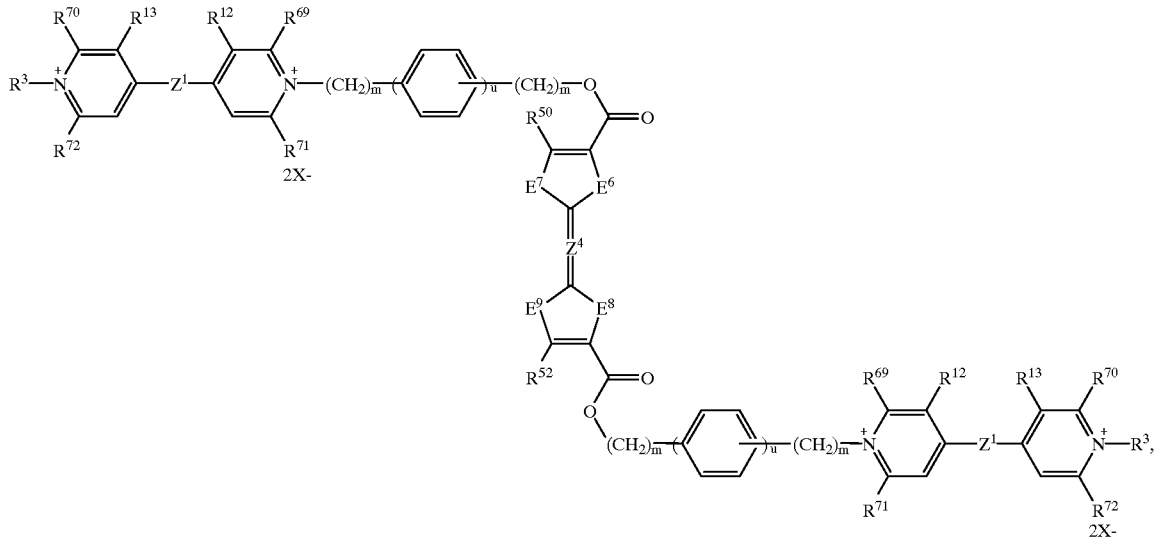
(XXXV)

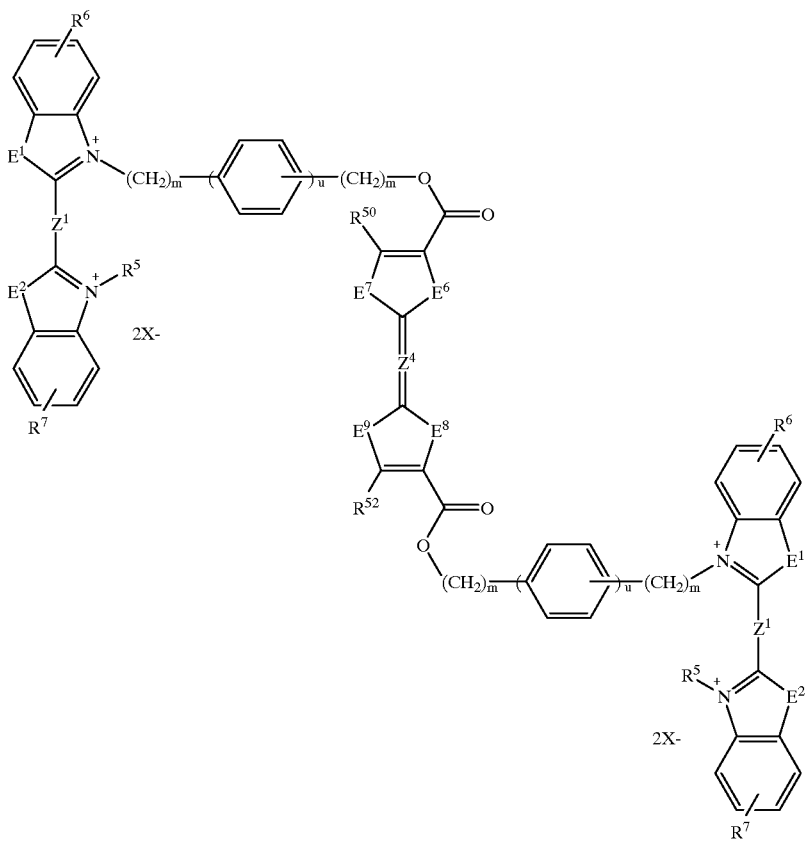
(XXXVI)
or at least one substance of the formula (Ic) corresponding to one of the formulae
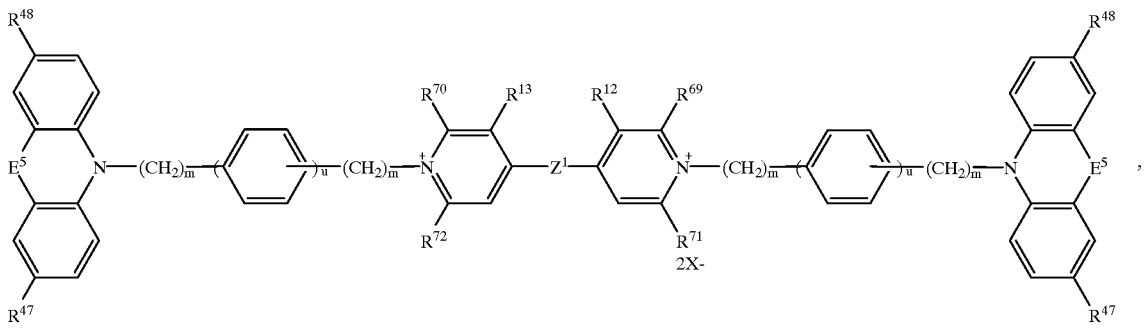
(XXXVII)

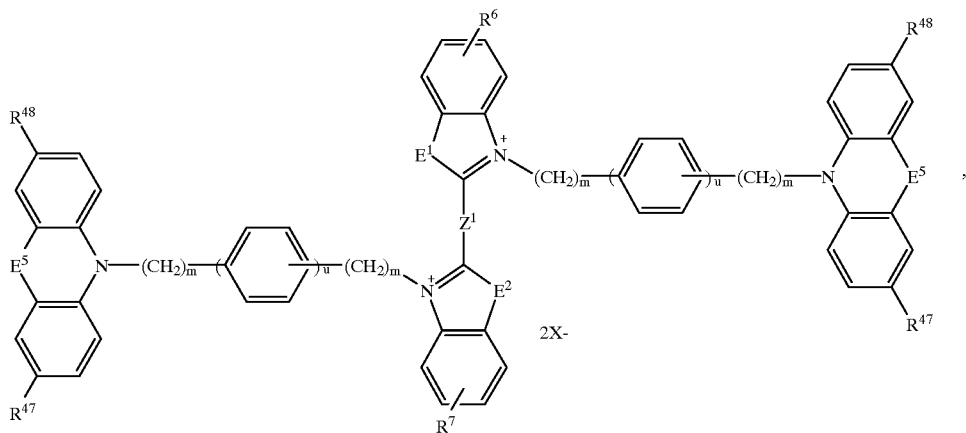
(XXXVIII)
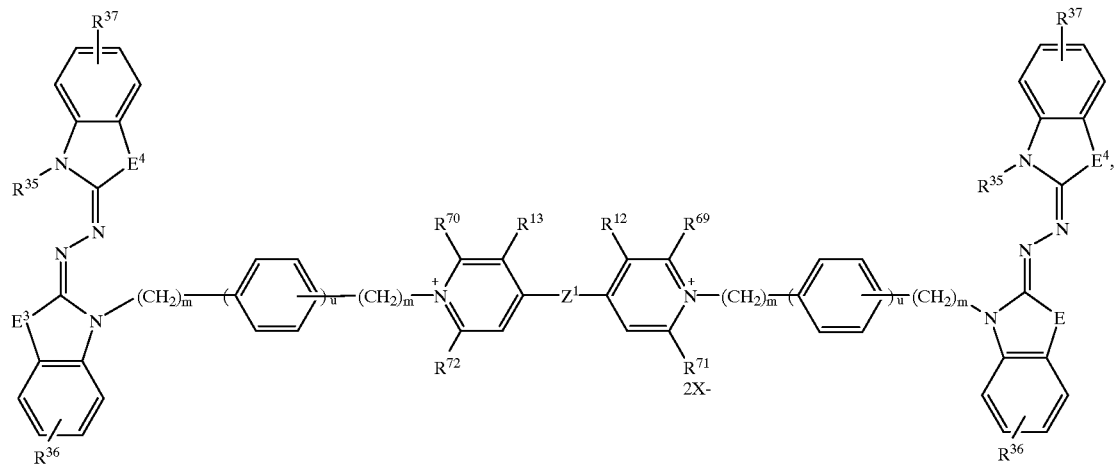
(XXXIX)
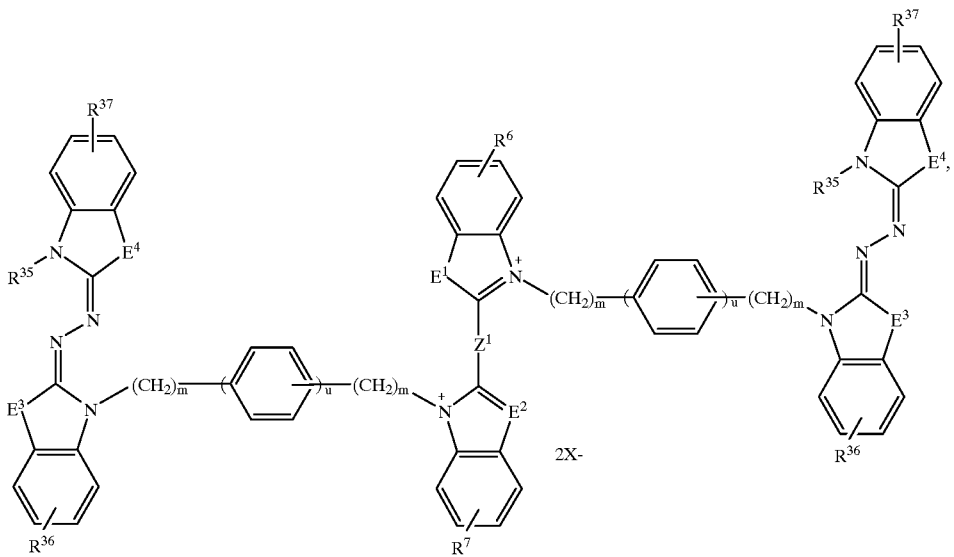
(XL)

(XLI)

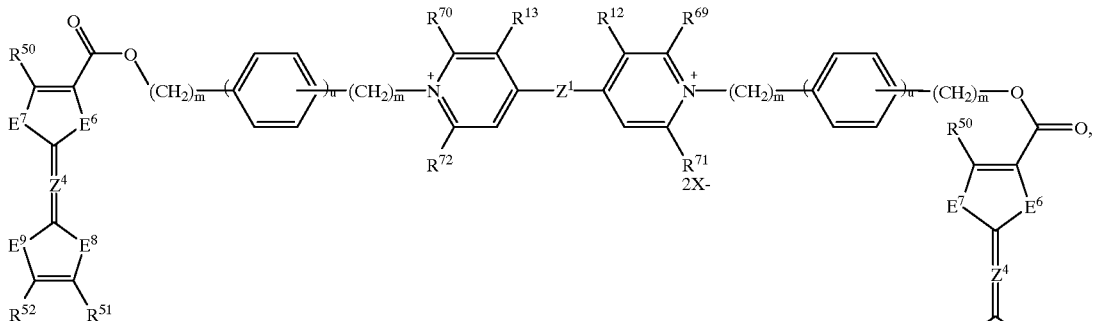

(XLII)

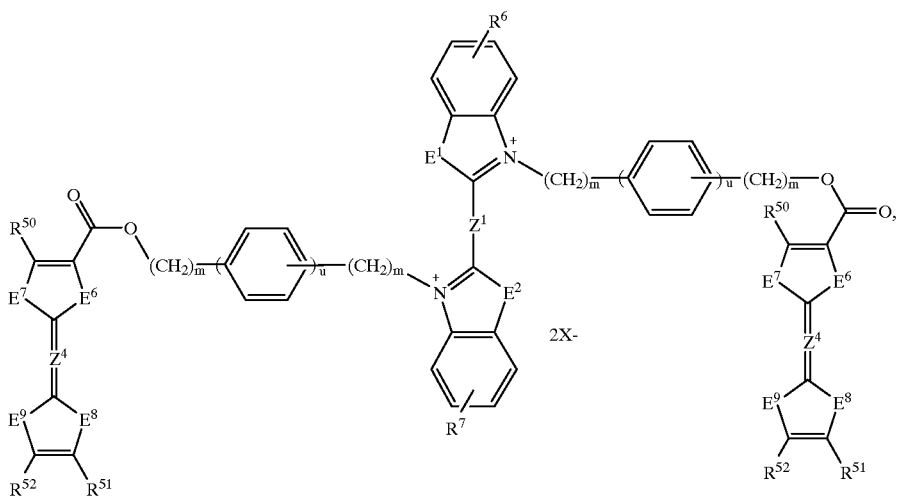

in which
- $R^3$, $R^5$, $R^{35}$ and $R^{39}$, independently of one another, represent methyl, ethyl, propyl, butyl, pentyl, hexyl or benzyl,
- $R^6$, $R^7$ and $R^{36}$, $R^{37}$ are pairwise identical and represent hydrogen, methyl, methoxy, chloro, cyano or methoxycarbonyl,
- $R^{12}$ and $R^{13}$ represent hydrogen or, if $Z^1$ represents a direct bond, jointly represent a CH=CH bridge,
- $R^{69}$ to $R^{72}$ are identical and represent hydrogen or methyl,
- $E^1$ and $E^2$ are identical and represent O or S,
- $Z^1$ represents a direct bond or —CH=CH—,
- $R^{32}$, $R^{47}$ and $R^{48}$ represent hydrogen,
- $E^3$ to $E^5$, independently of one another, represent O, S, or $NR^{59}$, $E^3$ and $E^4$ being identical, however,
- $R^{29}$ to $R^{31}$ and $R^{59}$, independently of one another, represent methyl, ethyl, propyl, butyl, pentyl, hexyl or benzyl, $R^{29}$ to $R^{31}$ preferably being identical,
- $R^{40}$ and $R^{41}$ are identical and represent hydrogen, methyl, ethyl, propyl, butyl or phenyl,
- $Z^3$ represents a direct bond, —CH=CH— or —N=N—,
- $R^{50}$ to $R^{52}$, independently of one another, represent hydrogen, methyl, methoxy, chloro, cyano, methoxycarbonyl, ethoxycarbonyl or phenyl, but are preferably identical,
- $E^6$ to $E^9$ are identical to one another and represent S, Se or $NR^{59}$,
- $Z^4$ represents a direct double bond, a =CH—CH= or =N—N= bridge,
- m represents an integer from 1 to 5,
- u represents 0 or 1 and
- $X^-$ represents a colorless anion which is redox-inert under the conditions, where the representation

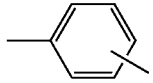

in the above-specified formulae represents a link in the o-, m-, or p- position, and b) comprises, as the substance $OX_2''$, at least one substance of the formula (CI) as claimed in claim 6.

10. An electrochromic fluid comprising an electrochromic system as claimed in at least one of claim 1 and at least one inert solvent.

11. An electrochromic device containing an electrochromic fluid as claimed in claim 10.

12. The electrochromic device as claimed in claim 11, which is designed as a cell such as e.g. a solar cell, as a window pane, mirror, canopy or display.

13. The electrochromic device as claimed in claim 11, which comprises two transparent glass or plastic panes which face one another, one of them optionally being mirrored and whose sides which face one another are coated electroconductively, between which the electrochromic fluid is contained.

14. The electrochromic device as claimed in claim 12, which comprises two transparent glass or plastic panes which face one another, one of them optionally being mirrored and whose sides which face one another are coated electroconductively, between which the electrochromic fluid is contained.

\* \* \* \* \*